United States Patent [19]

LaVars

[11] Patent Number: 5,611,419
[45] Date of Patent: Mar. 18, 1997

[54] MONORAIL CONVEYOR SYSTEM

[75] Inventor: Everett LaVars, Pomona, Calif.

[73] Assignee: Sunkist Growers, Inc., Ontario, Canada

[21] Appl. No.: 377,567

[22] Filed: Jan. 24, 1995

[51] Int. Cl.$^6$ .................................................... B65G 47/38
[52] U.S. Cl. ...................... 198/370.04; 198/779; 209/912
[58] Field of Search ............................... 198/387, 370.01, 198/370.04, 779, 850; 209/912; 301/111, 124.1, 131, 132; 305/52

[56] References Cited

U.S. PATENT DOCUMENTS

| | | | |
|---|---|---|---|
| 2,695,095 | 11/1954 | Anderson | 198/850 |
| 2,863,701 | 12/1958 | Jones et al. | 301/111 X |
| 4,961,489 | 10/1990 | Warkentin | 198/370.04 |
| 5,174,429 | 12/1992 | LaVars et al. | 198/372 |

FOREIGN PATENT DOCUMENTS

92/18258  10/1992  WIPO .

Primary Examiner—F. J. Bartuska

[57] ABSTRACT

A monorail conveyor system is provided with a plurality of spool links which are rotatably interconnected with each other and are comprised of integrally molded plastic pieces. The spool links slide along a single rail which defines the conveyor track. One spool link rotatably engages the adjacent spool link to comprise a bearing connection between them. The bearing is an extended surface which is engaged by a driving wheel, such as a sprocket wheel, so that the plurality of spool links are directly engaged and driven along the single rail of the conveyor track without the use of any additional drive chain. Between each adjacent pair of spools is a cradle for carrying a citrus fruit or other object in the nest defined between the spools. The cradle is activatable in two modes, either as an object ejector or as an object lifter.

90 Claims, 14 Drawing Sheets

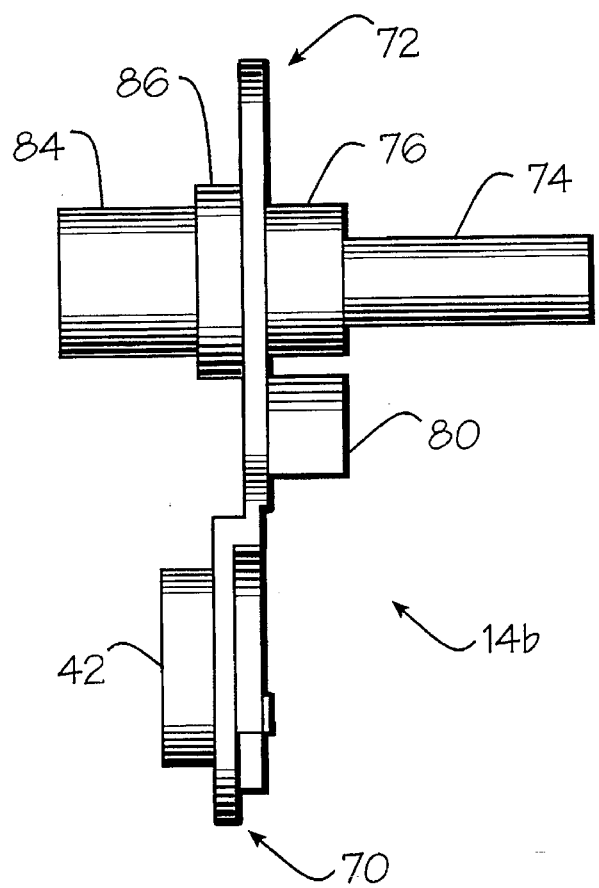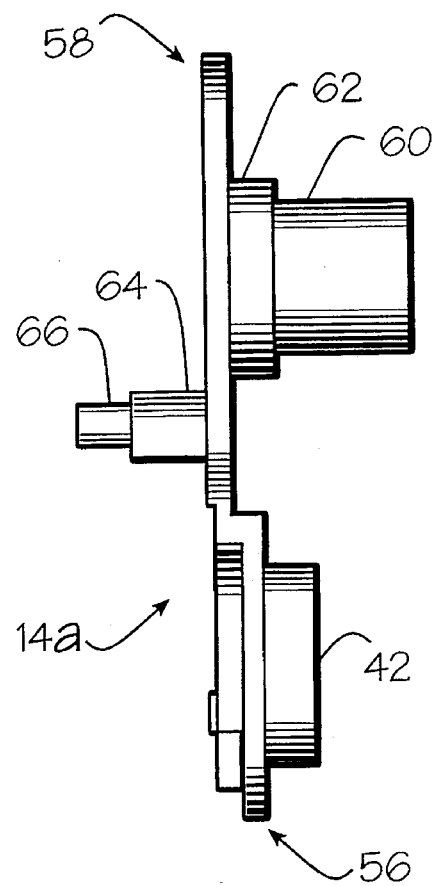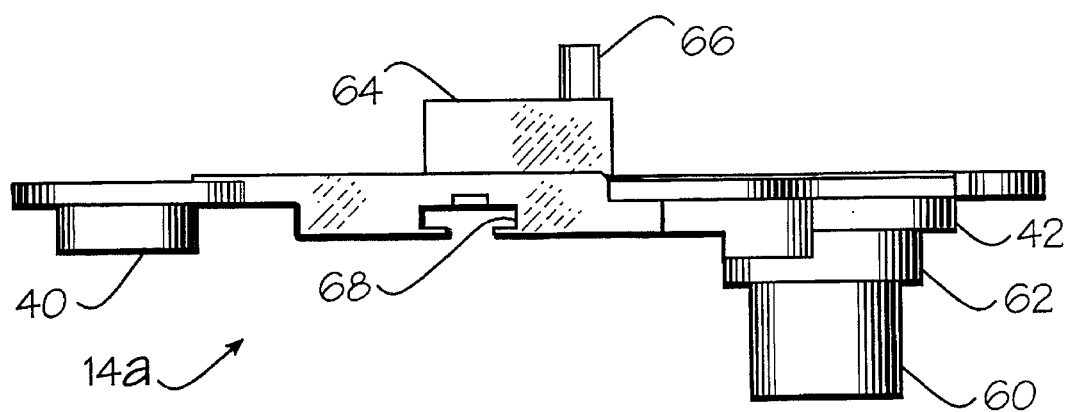

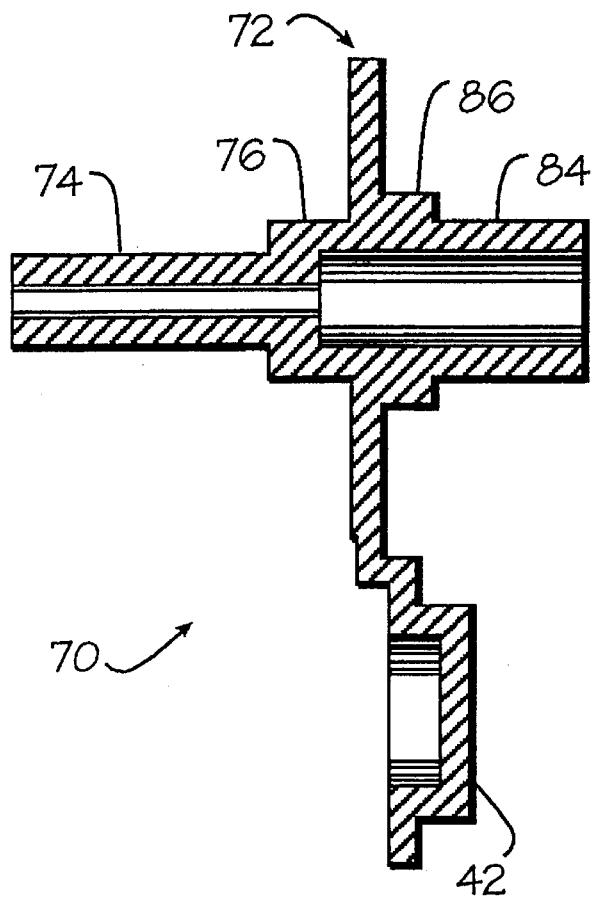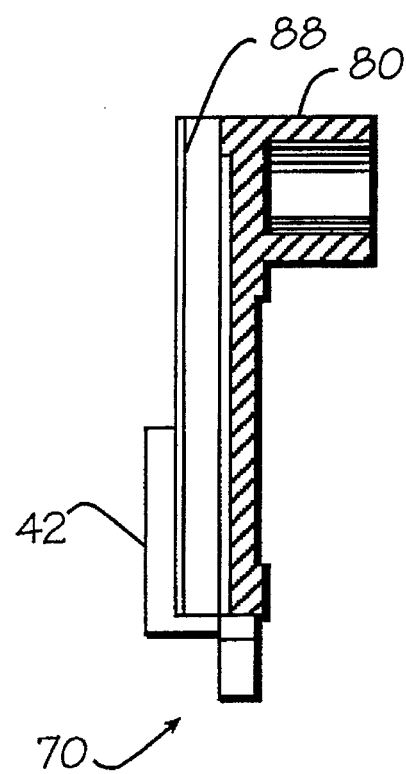
Fig. 13  Fig. 14
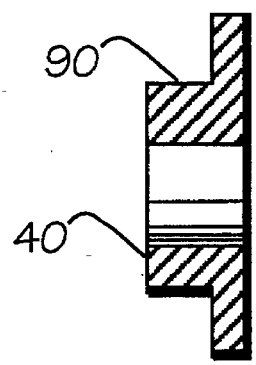
Fig. 15

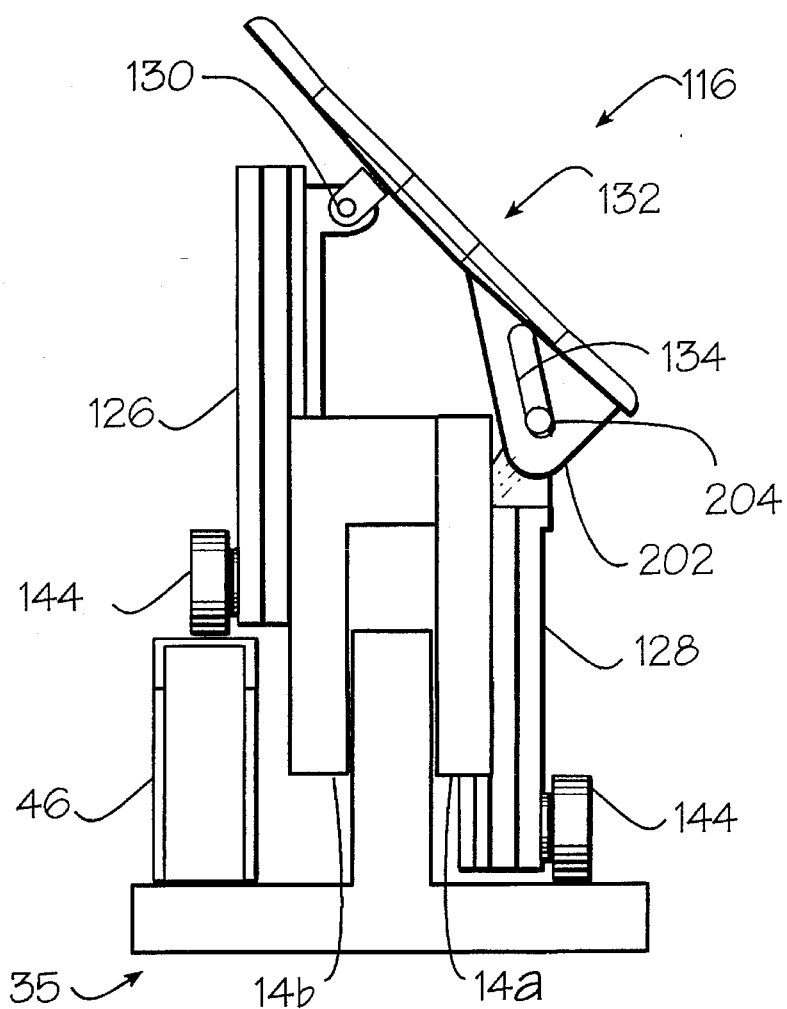
Fig. 21c
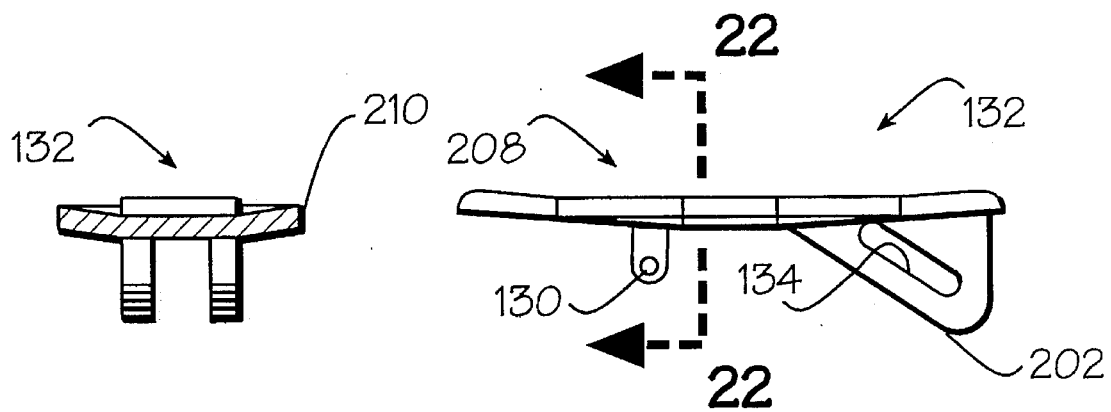
Fig. 22
Fig. 23

5,611,419

MONORAIL CONVEYOR SYSTEM

FIELD OF THE INVENTION

This invention relates to conveyer systems, and in particular to conveyer systems for handling individual objects such as citrus fruit, wherein the conveyer system incorporates a single rail.

DESCRIPTION OF THE PRIOR ART

Conveyor systems for carrying discrete objects, such as citrus fruit, typically are comprised of various types of carriers driven along a double rail system, such as shown in U.S. Pat. No. 5,174,429, "Conveyor Discharge Apparatus and Method", LaVars et al. The double rail system is usually comprised of a plurality of double-frustoconically shaped spools (i.e., bowtie-shaped in cross section), each carried on a spool pin with the ends of the pin extending to and resting on and otherwise engaging two parallel longitudinal surfaces or rails extending along the length of the conveyor. One end of each pin is coupled to a chain, which fixes the relative spacing of each of the spools in a closed chain loop as well as providing the connective means for imparting the motive force which moves the plurality of spools along the rails.

The use of double rails, while providing strength and stability for the spools, also doubles the weight and the amount of structural materials required. More importantly, it doubles the friction and wear surfaces of the conveyor system.

In response to these disadvantages, the art has devised a single rail or uni-conveyor system, one example of which is shown in Regier, "Apparatus and Method for Sorting Objects," PCT International Publication WO 92/18258.

In that uni-conveyor system the plurality of spools are driven by an underlying chain riding on a centrally positioned rail straddled by the spool carriers. Each citrus fruit or other object is then disposed between a successive pair of spools, in a cradle having a centralized pivotal lever forming part of the lower cradle surface, which lever can be selectively activated to eject the citrus fruit or other object from its nested position between the spools according the sorting protocol. The cradle itself may also be elevated into position to act as a weighing cradle for the citrus fruit or object.

Such a uni-conveyor system is able to realize many advantages over a dual-rail conveyor system. However, the basic structure of the conveyor is conceptually identical to the dual conveyor system, in that a chain is required to be added as part of the system to provide an interconnecting link between each of the spools in the conveyor and a means for providing a motive force to each of the spools to carry them down the conveyor line. These chains are typically driven by sprocket wheels, which are expensive to manufacture, and are typically manufactured from metal and therefore subject to corrosion and its resulting ill effects, such as binding and increased friction in the normally wet and dirty environment in which the conveyor must operate.

Therefore, what is needed is some type of single-rail conveyor system which is not subject to the limitations of either the prior art chain driven, double-rail conveyor system or the uni-conveyor system just described or otherwise implemented.

BRIEF SUMMARY OF THE INVENTION

The present invention is a chainless monorail conveyor system for moving objects, comprising a single rail and a sequence of pivotally interconnected individual spool links in rolling disposition on the rail. A drive mechanism is coupled to the sequence of spool links for moving the sequence of spool links along the rail. Virtually the entire conveyor, which is typically assembled as an endless sequence of pivotally interconnected spool links, can be made of lightweight, low-friction plastics. As a result, frictional surfaces within the conveyor system, the amount of motive power required and opportunity for corrosion are all substantially reduced.

Each of the spool links comprises a body, a spool pivotally coupled to the body, a central support wheel and a reciprocally movable cradle slidingly coupled to the body. The cradle is activatable in two modes, a first mode functioning as an ejection finger, and a second mode functioning as a freely liftable platform. In one embodiment, the second mode of the cradle comprises a weighing mode, where the cradle is lifted and the object disposed in the cradle is weighed.

The cradle comprises a left and right legs slidingly coupled to the body and a saddle rotatably coupled to one of the legs and slidingly coupled to the opposite leg. Vertical activation of one or both of the legs selectively activates the cradle in one or both of those two modes.

Each spool link is pivotally and detachably coupled to an adjacent spool link by means of a shoulder pivot on one link which engages a capturing bearing on the adjacent link. The shoulder pivot and bearing are keyed to permit detachment only when adjacent spool links have a single predetermined angular orientation with respect to each other. The angular orientation in which detachment is permitted is an angular orientation which is not achieved within the conveyor system by adjacent spool links during normal operation. Normally an endless sequence is created by attachment of a sequence of spool links, with the free shoulder pivot of the final link at one end being engaged with the free capturing bearing of the final link at the opposite end.

The body is comprised of two integral sides formed to provide coupling surfaces for the spool and cradle. The sides form and couple with each other to provide an assembled spool link. In the illustrated embodiment, each of the spool links is comprised of relatively light, non-corrosive material, such as molded plastic.

As stated, each of the spool links is coupled to an adjacent spool link by means of rotatable bearings, each of which also provides a laterally extending surface. The drive mechanism engages the lateral surface of the bearings to positively couple the drive to the spool links, thus moving the sequence of spool links on the rail.

The invention may also be characterized as a device used in a conveyor system for holding an object, comprising a single cradle for carrying the object. The single cradle is selectively actuatable in two modes: a first mode for providing the function of an ejection finger, and a second mode for freely elevating an object disposed on the cradle.

The invention is still further characterized as a monorail conveyor system having a conveyor track comprising a single rail, and a normally endless sequence of pivotally interconnected spool links for supporting objects while carried along the conveyor track. The spool links are guided along the conveyor track by the single rail. The spool links have engagement surfaces defined thereon to permit the sequence of spool links to be directly drawn along the single track without the use of a drive chain.

The invention may additionally be characterized as a conveyor element which, when sequentially attached to other, similar elements, may form an endless sequence constituting a monorail conveyor system operable without the use of any drive chain.

The invention may be better visualized by turning to the following figures, wherein like elements are referenced in the various Figures by like numerals.

BRIEF DESCRIPTION OF DRAWING

FIG. 8 is a front elevational view of the spool link body side of FIGS. 6 and 7.

FIG. 9 is a plan view of the spool link body side shown in FIGS. 6–8.

FIG. 10 is a front elevational view of the side of the spool link body opposite the body side shown in FIGS. 6–9.

FIG. 13 is a cross sectional view through section lines 13—13 of FIG. 12.

FIG. 14 is a cross sectional view through section lines 14—14 of FIG. 12.

FIG. 15 is a cross sectional view through section lines 15—15 of FIG. 12.

FIG. 22 is a cross sectional view through section lines 22—22 of FIG. 23.

FIG. 23 is a side elevational view of the cradle shown in FIG. 21a.

DETAIL DESCRIPTION OF THE PREFERRED EMBODIMENTS

A monorail conveyor system is provided with a plurality of spool links which are pivotally interconnected with each other, and which can be comprised of integrally molded plastic pieces. The spool links slide along a single rail which defines the conveyor track. One spool link pivotally engages the adjacent spool link in a bearing connection between them. The bearing has an extended surface which is engaged by a driving wheel, such as a plastic sprocket wheel, so that an endless sequence of spool links are directly engaged and driven along the single rail of the conveyor track without the use of an additional drive chain.

In each spool link, adjacent the spool incorporated therein, is a cradle for carrying a citrus fruit or other object in the nest defined between the successive pair of spools when that spool link is interconnected to a similar one. The cradle is activatable in two modes, either to act as a pivoting ejection finger to eject the citrus fruit or other object from the nest defined between the spools or as a lifter to freely elevate the citrus fruit for weighing or other processing. As will be further described below, a combination of actions is also possible within the scope of this invention. In particular, a pivoting action followed by a lifting action has been shown to be particularly advantageous in the case of small fruit and/or high speed operation of the system.

Figure 1:
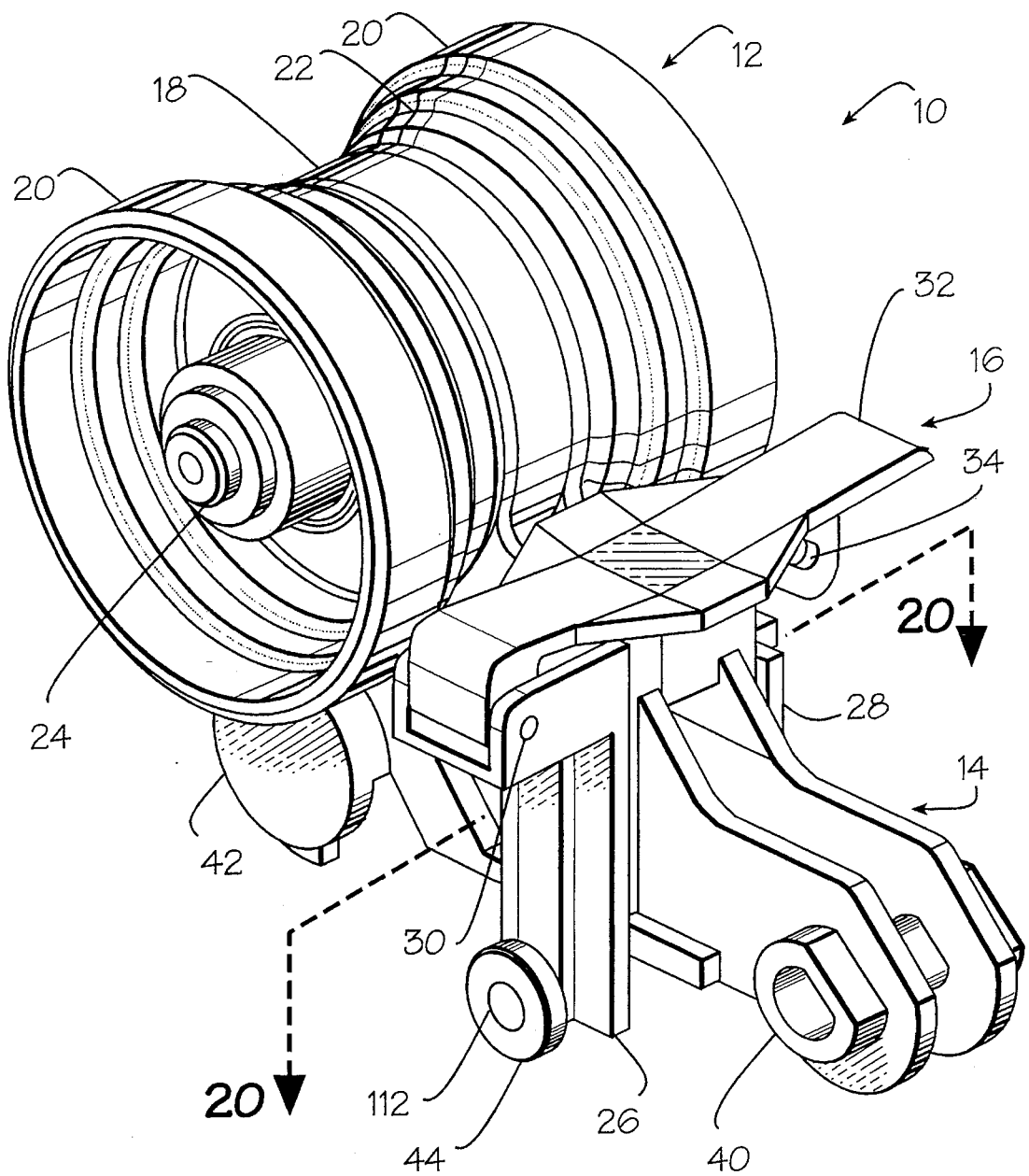
FIG. 1 is a perspective view of a single spool link of the conveyor system of the invention, shown in isolation from other similar links in the sequence of spool links and other elements of the conveyor system.

FIG. 1 is a perspective view of a single spool link in assembled form shown in isolation from all other elements of the monorail conveyor system. The spool link, generally denoted by reference numeral 10, comprises a single unit which when replicated can be pivotally coupled, end to end, with a similar spool link, as better described and shown below in connection with FIGS. 2 and 3, to comprise an endless-sequence, single rail conveyor system. Spool link 10 is comprised of a spool 12, body 14 and cradle 16. Spool 12 is rotatably coupled to the body 14, and cradle 16 is slidingly disposed on body 14 in such a manner to permit selective vertical movement of cradle 16 as seen in the orientation of FIG. 1. The rotatable coupling of spool 12 to body 14 and reciprocating coupling of cradle 16 to body 14 will be better understood below when the detailed structure of body 14 is described.

Before considering these details, it must be understood that although spool 12 is shown as a symmetric, double-frustoconical spool having a plurality of surfaces and ridges of distinct diameters, any type of spool, roller or handling device for citrus fruit or other objects now known or later devised may be employed in its place. In the embodiment illustrated in FIG. 1, Spool 12 is comprised of three rotatable sections coupled about an axis of rotation formed from body 14, only end 24 of which is visible in FIG. 1. In this embodiment, spool 12 is comprised of a center ring 18 disposed between two identical rotatable spool hubs 20, each having a plurality of stepped surfaces 22 defined thereon in order to contact or spin different diameter objects disposed on spool 12, or more properly between adjacent spools 12. The center ring 18 is separately mounted on the axis, and it thus may rotate separately from the spool hubs 20. Likewise, hubs 20 may rotate independently from one another and from the center ring 18. It is important to note that in the preferred embodiment of the invention, the rolling contact between the respective central rings of the spool links and the track upon which the conveyor rides provides the support for the conveyor.

While the following description of the illustrated embodiment shall be presented in the context of a conveyor system for spherical objects, and in particular for citrus fruit, it must be expressly understood that wherever a reference is made to fruit that any object of any nature may be equivalently substituted therefore.

Similarly, as will be described below in greater detail in connection with FIGS. 16–20, cradle 16 is comprised of reciprocating legs 26 and 28, slidingly coupled with body 14. Leg 26 is pivotally coupled at pivot 30 to a saddle 32 of cradle 16, which saddle 32 is slidingly coupled through a slot 34 to the opposing leg 28 of cradle 16.

In the alternative embodiment shown in FIGS. 21–23, analogous structures, denoted generally by reference numerals 100 greater than those used in reference to the previous embodiment, interact in somewhat similar fashion. Specifically, cradle 116 is comprised of reciprocating legs 126 and 128, slidingly coupled with body 14 of the previously-described embodiment. Leg 126 is pivotally coupled at pivot 130 to a saddle 132 of cradle 116, which saddle 132 is slidingly coupled by means of a pivot 204 through a slot 134 in flange 202 to the opposing leg 128 of cradle 116.

Figure 2:
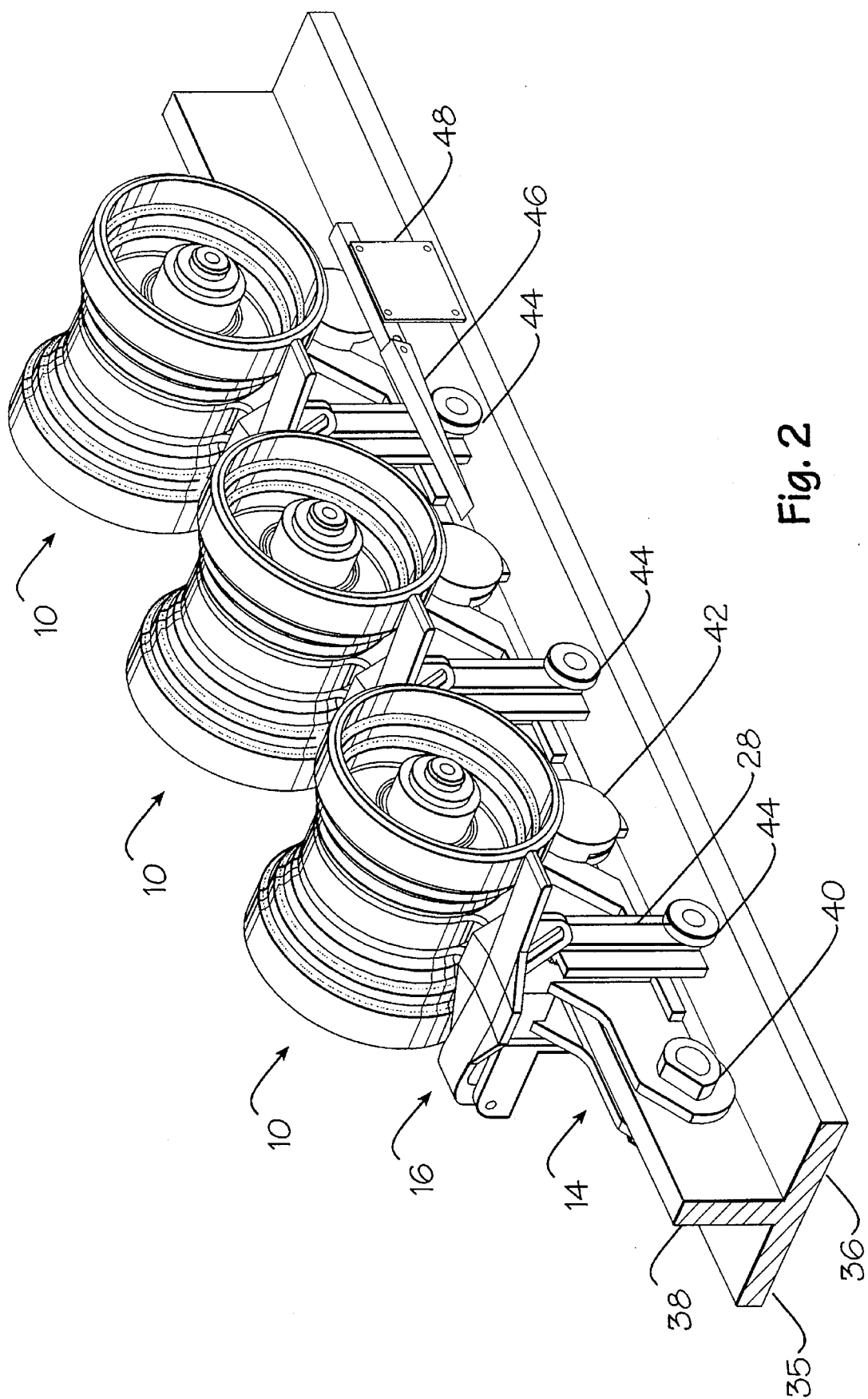
FIG. 2 is a perspective view of three interconnected spool links of the type shown in FIG. 1.

Returning now to the first-described embodiment of the invention, the combination of a plurality of spool links 10 shown in FIG. 1 to comprise a monorail conveyor is best depicted in FIG. 2, wherein three such spool links 10 are shown in perspective view pivotally coupled to each other and slidingly disposed on a T-bar-shaped rail 35 having a base plate 36 and a single vertical wall 38. Any type of rail configuration known may be used consistent with the functional principles of the present teaching, and the form of the rail is not limited to that shown or described in the illustrated embodiment.

Each spool link 10 is pivotally coupled the adjacent spool link 10 at one end by means of a cammed shoulder 40 which slides into and is rotatable within a capturing bearing 42 of the adjacent spool link 10. The preferred form of shoulder 40 and bearing 42 and their combination will be better illustrated and understood in connection with the detailed description of the spool link sides described in relation to FIGS. 6–15.

The ability of the cammed shoulder 40 of a spool link 10 to be held securely by the capturing bearing of 42 of an adjacent spook link 10, may, without reference to the exact shapes of those two elements, be referred to generally as a "mating relationship" between the respective shapes of those two elements. Indeed, although the cammed shoulder 40 and capturing bearing 42 of the same spool link 10 could not, of course, be mated together, that same "mating relationship" exists between their respective shapes, since all spool links 10 will normally be identical in configuration. The detailed description of the preferred embodiment of the present invention specifies the preferred respective shapes of the cammed shoulder 40 and capturing bearing 42. However the shape of each of these two elements could be changed, within the scope of this invention, so long as this "mating relationship" between the two respective shapes is retained, in order to allow the cammed shoulder 40 of one spool link 10 to be held by the capturing bearing 42 of the adjacent spook link, to create a sequentially attached series of these spool links.

FIG. 2 is also useful in illustrating the manipulation of cradle 16 within the conveyor system. As shown in FIGS. 1 and 2, each cradle 16 is provided at the bottom portion of its legs 26 and 28 with a roller wheel 44. The roller wheel 44 may or may not ride upon base flange 36 when in its lowermost position, since the degree of descent of cradle 16 on body 14 is inherently limited by its coupling thereto. However, even where roller wheel rides upon base flange 36, it is the central ring 18 riding on the vertical Wall 38 of the track 35 which provides the primary support for the spool links 10 and of the conveyor which they collectively comprise.

Figure 4:
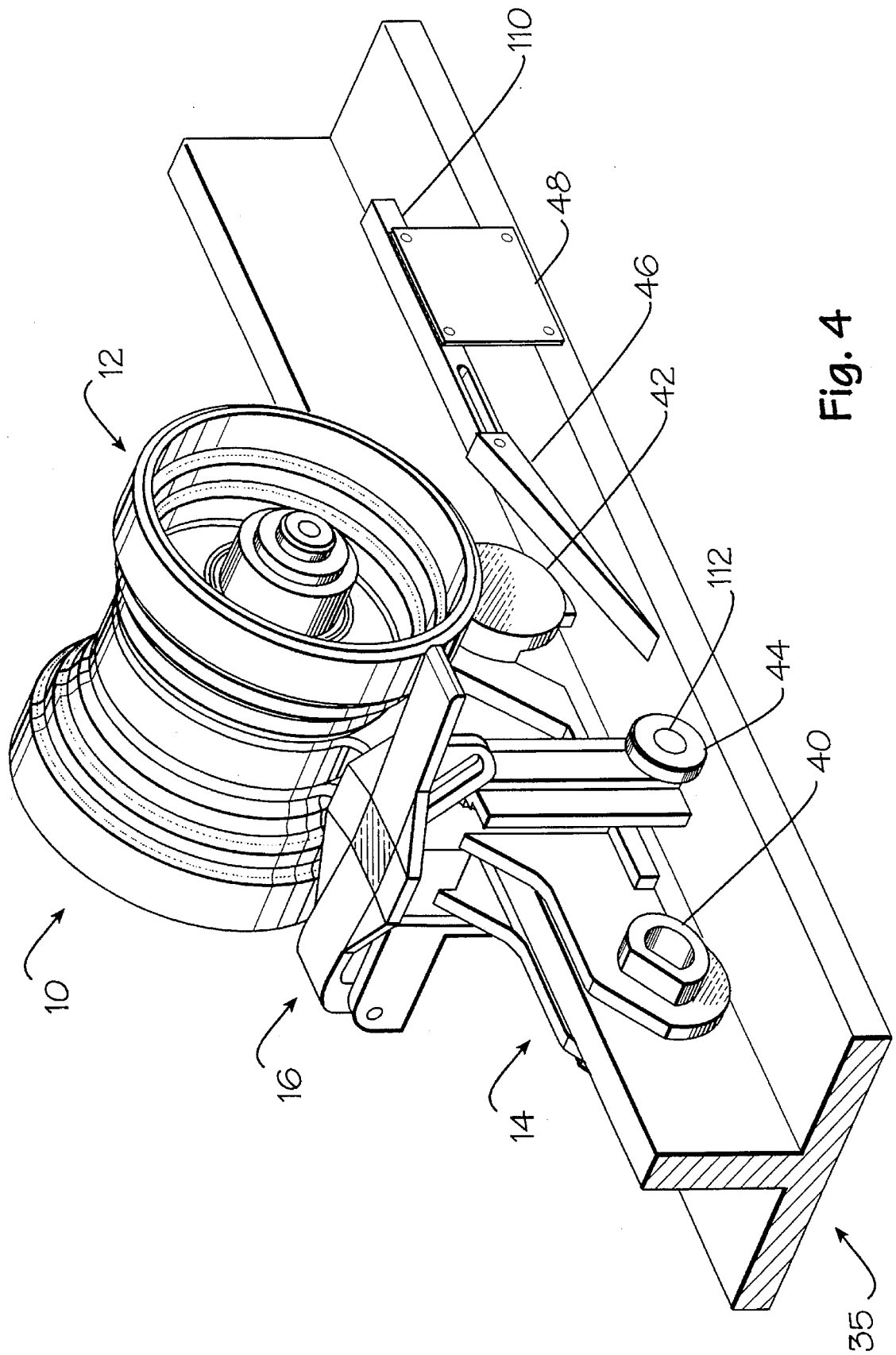
FIG. 4 is a perspective view of a single spool link of the type shown in FIGS. 1–3, in which the intra-spool cradle is about to be elevated by means of a selectively activated ramp.

In any case, roller wheel 44 provides rolling contact with an actuatable or nonactuatable ramp. FIG. 2 shows actuatable ramp 46 at a predetermined station 48. Ramp 46 provides a ramping surface which can either be extended out of the normal path of the roller wheel 44, as shown in FIG. 2, or selectively lowered, as shown in FIG. 4, by electrical, mechanical or any other means to serve as a receiving ramp for roller wheel 44. As suggested, ramp 46 may also take the form of a cam or fixed ramp as well.

Figure 5:
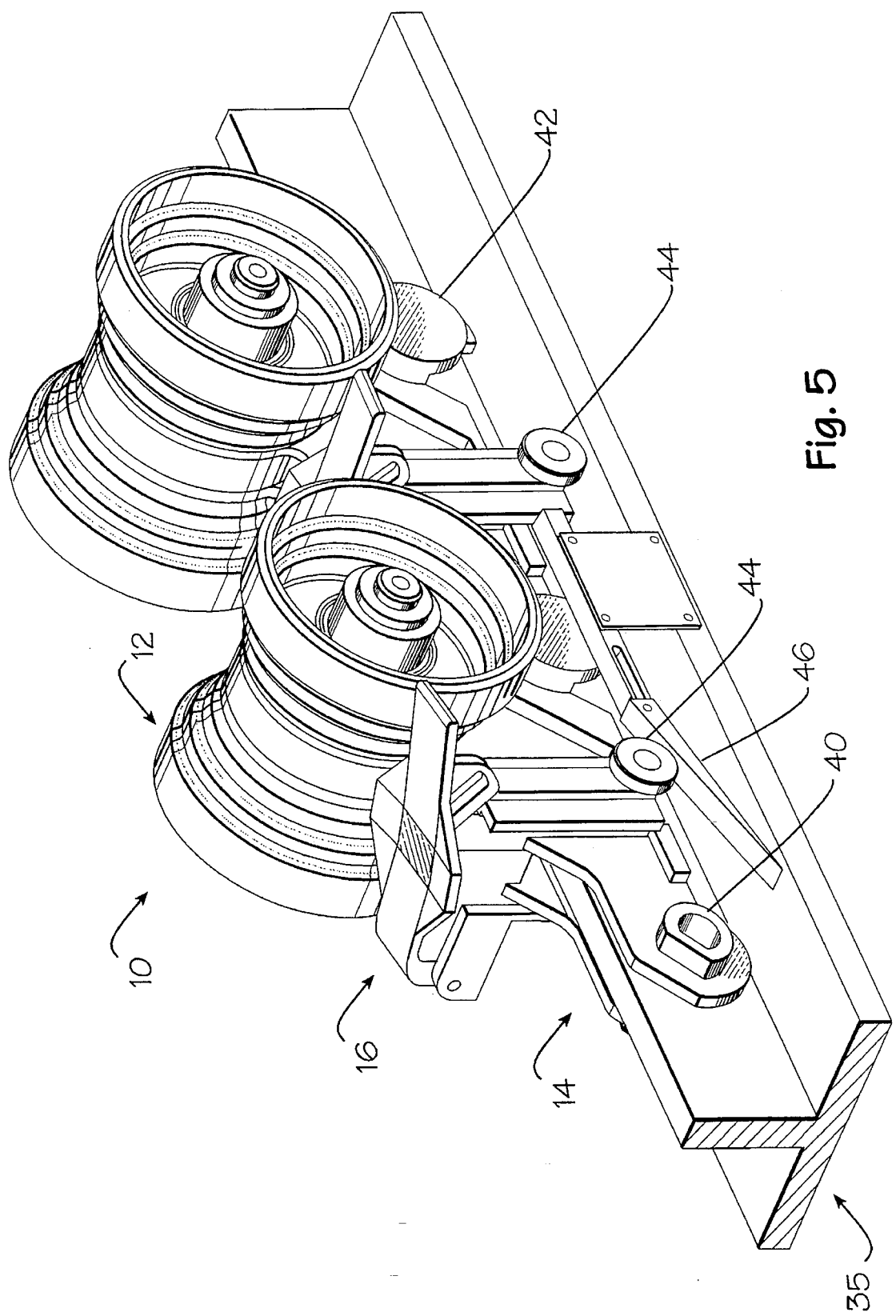
FIG. 5 is a perspective view of the spool link shown in FIG. 4, and an adjacent similar spool link, in which the spool links have advanced and one of the intra-spool cradles has begun to be elevated by the selectively activated ramp.

As spool link 10 is driven down rail 35, it will ride up upon ramp 46 if ramp 46 has been actuated, as shown in FIG. 5, thereby actuating cradle 16. As will be further described below, activation of cradle 16 may cause either a pivoting action, if only one of the roller wheels 44 rides up upon ramp 46, or a lifting action if both roller wheels simultaneously ride up upon ramps 46 situated on opposite sides of the rail 35. Particularly in the embodiment shown in FIGS. 21–23, the activity may constitute first a pivoting action, followed by a lifting action. The advantages of this combination of actions will be described in more detail below.

Figure 3:
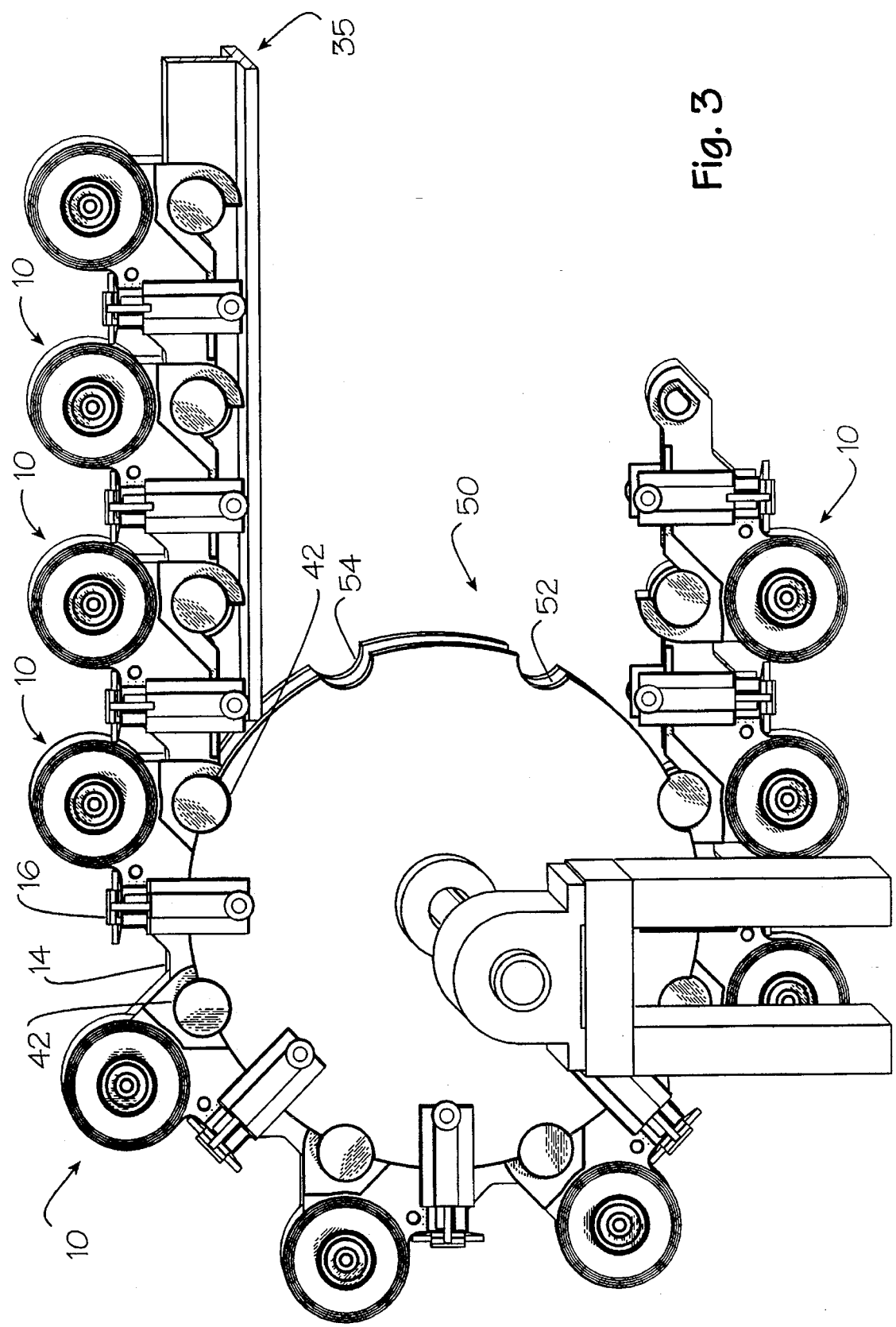
FIG. 3 is a side elevational view of a plurality of spool links of the types shown in FIGS. 1 and 2, shown in engagement with a drive wheel.

We now consider further how the plurality of spool links 10 are combined to form a complete conveyor system. FIG. 3 is a side elevational view of a sequence of spool links 10 pivotally coupled together, as described in connection with FIG. 2, which spool links 10 are being driven or drawn along rail 35 by means of a sprocket drive wheel 50. In embodiment illustrated in FIG. 3, drive wheel 50 is comprised of a pair of spaced apart disks 52—normally fabricated from metal, such as aluminum or steel—in which a plurality of semicircular cutouts or indentations 54 have been defined in the periphery of each disk 52. Indentations 54 are shaped to match the outer envelope of capturing bearings 42 of bodies 14 of each spool link 10 and are spaced along the circumference of disk 52 at intervals equal to the interlink spacing between capturing bearings 42 of the bodies 14 of the adjacent spool links 10. By this means drive wheel 50 positively engages spool links 10 to carry them along rail 35, with each body 14 being disposed between the two disks 52. The extended portions of cradles 16 may extend exterior to disks 52, so that cradle 16 straddles drive wheel 50. Since they will normally be interconnected in an endless sequence, spool links 10 will therefore form a loop which extends around drive wheel 50 by at least half its circumference and which is then decoupled from the bottom of drive wheel 50, as shown in FIG. 3, to provide a return path of the conveyor system. An identical or similar wheel 50 may be provided at the opposing end of the conveyor system, with either one or both of those wheels driven according to principles and means well known to the art, typically by selectively controlled electric motors (not shown).

Figure 24:
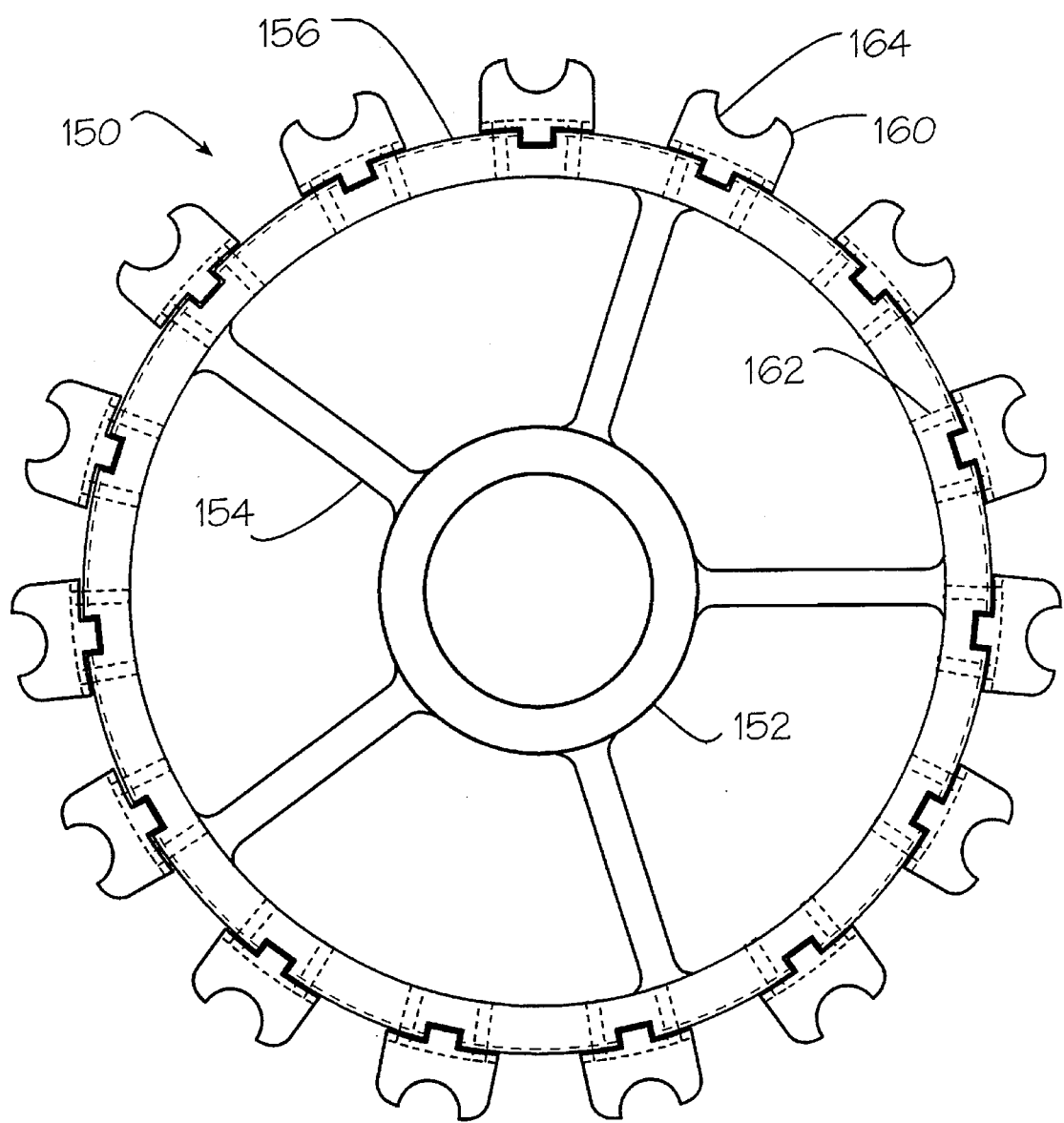
FIG. 24 is a side elevational view of an embodiment of the drive wheel 50, which is an alternative to the drive wheel embodiment shown in FIG. 3. The invention and its various embodiments may now be better understood by turning to the following detailed description.

FIG. 24 illustrates an alternative embodiment of the drive wheel just described in the context of FIG. 3. In FIG. 24, drive wheel 150 consists of an inner hub 152 from which spokes 154 radiate to support an outer ring 156. Attached to the outer ring 156 by means of removable bolts 162 are gripping members 160. In the outer surface of each of the gripping members 160 is a concavity 164 which is configured to match the outer envelope of capturing bearings 42. The gripping members are distributed about the outer ring 156 so that as the drive wheel 150 turns, each capturing bearing 42 in the sequence of spool links 10 will be engaged by a gripping member 160. In the event that one of the gripping members 160 becomes worn or breaks off, it can easily be replaced by a spare.

Typically, these gripping members are made from nylon or plastic, which allows for easy fabrication, by injection molding, and which also insures a low-friction, quiet engagement between the gripping members 160 and the mating capturing bearings 42. I have found that the best material from which to mold the gripping members- and, indeed, all parts of the spool link 10 which will subjected to rotation, sliding, rubbing or other relative-motion contact— is a teflon-containing plastic, such as acetyl teflon. Use of such materials on all such bearing surfaces reduces wear and thus lengthens component service life. It also contributes to a reduction in the motive force required to drive the sequence of spool links 10.

It will be understood that, just as in the case of the previously-described embodiment of the drive wheel 50, drive wheel 150 will normally be implemented as a pair of outer rings 156, each with a peripheral set of gripping members 160, each outer ring 156 being supported by a set of spokes 154 from the single inner hub 152. As in the case of drive wheel 50, this allows drive wheel 150 to permit each spool link 10 to travel between the two outer rings 156, with contact between a spool link 10 and the drive wheel 160 occurring only as contact between the outer concavities 164 of a pair of symmetrically-disposed gripping members 160 and the outer envelopes of the respective capturing bearings 42.

The use of spool link 10 now having been described in assembled form both individually and collectively in a complete conveyor system, we now consider the detailed structure of each spool link 10 and how its structure serves or supports the features and advantages described in connection with its assembled form in FIGS. 1–5.

Figure 6:
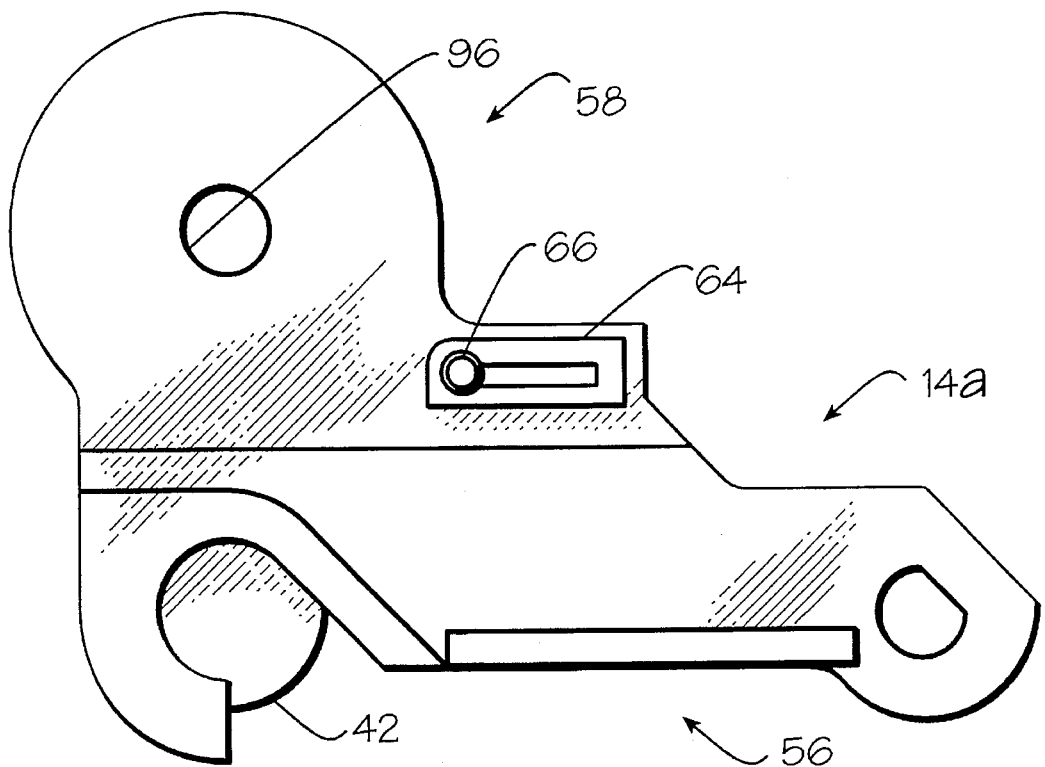
FIG. 6 is a inner side elevational view of a spool link body half shown in isolation from other elements of the spool link.

FIG. 6 is a side elevational inside view of a first side 14a of body 14. Body side 14a is normally comprised of a unitary injection-molded piece of low-friction plastic (such as described, above, in reference to gripping members 160), as is each of the other elements of spool link 10, having a lower chassis portion 56 and an upper spool portion 58. The corresponding outside surface of body side 14a is shown in side elevational view in FIG. 7. Comparison of the views in FIGS. 6 and 7 will assist in understanding what is depicted in each.

Figure 7:
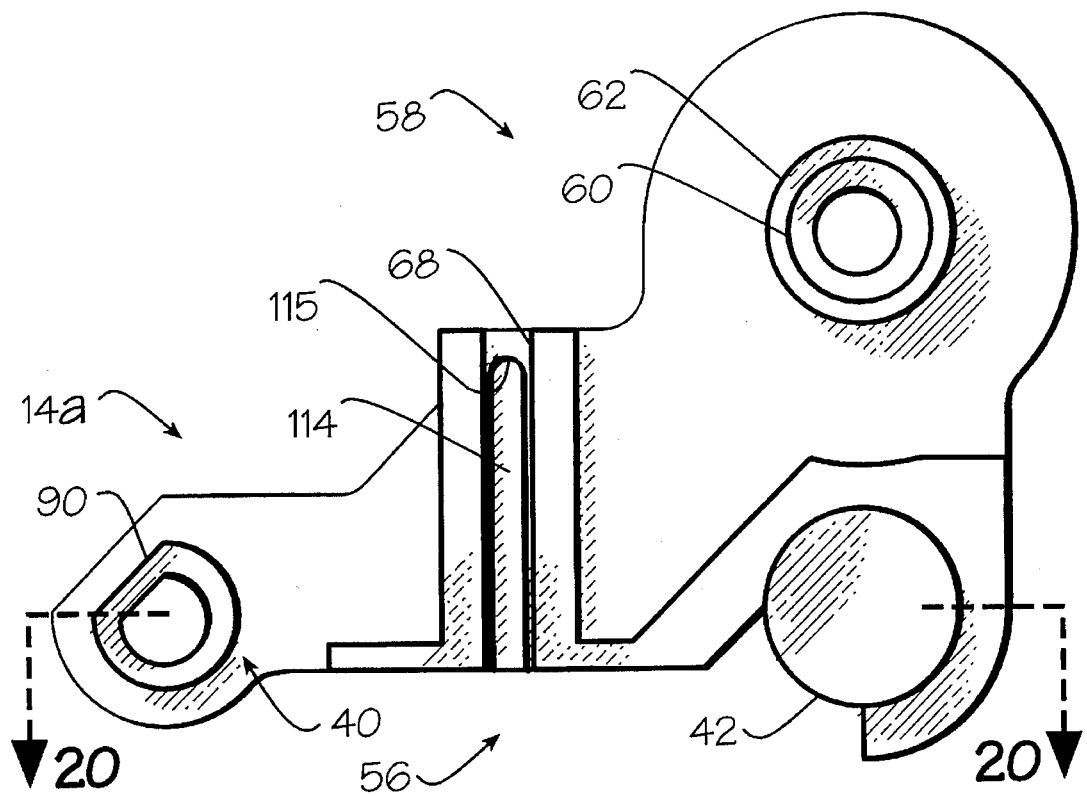
FIG. 7 is an outer side elevational view of the spool link body half shown in FIG. 6.

Referring now to both FIGS. 6 and 7, spool portion 58 has a generally circular shape to match the shape and diameter of center ring 18 and spool hubs 20. Integrally extending from spool portion 58 is a pivot pin 60 extending outward from an integrally formed shoulder 62, to which spool hubs 20 are rotatably mounted. This pivot pin 60 constitutes the axis of rotation of center ring 18 and the two spool hubs 20. Pivot pin 60 can best be visualized by viewing the front elevational view of first side 14a as seen in FIG. 8. Because the spool portion 58 is normally injection molded from low-friction plastic, pivot pin will provide a low-friction axis on which the center ring 18 and spool hubs 20 may rotate.

Focusing now on chassis portion 56, shown in FIGS. 6 and 7, the interior surface of body side 14a is provided with a generally rectangular spacer 64 from which an interconnecting pin 66 integrally extends. The shape and disposition of rectangular spacer 64 and interconnecting pin 66 is best illustrated by comparing the side view of FIG. 6 with the front elevational view of FIG. 8 and the plan view of FIG. 9.

FIG. 6 also illustrates the inside view of capturing bearing 42, while the more recognizable outside view of capturing bearing 42 and cammed shoulder 40 are depicted in FIG. 7. FIG. 7 also best illustrates slot 68 in which leg 26 of cradle 16 is disposed. As shown in the plan view of FIG. 9, slot 68 is defined within body side 14a to provide a capturing channel into which an appropriately shaped flange of leg 26 of cradle 16 is disposed.

Figure 11:
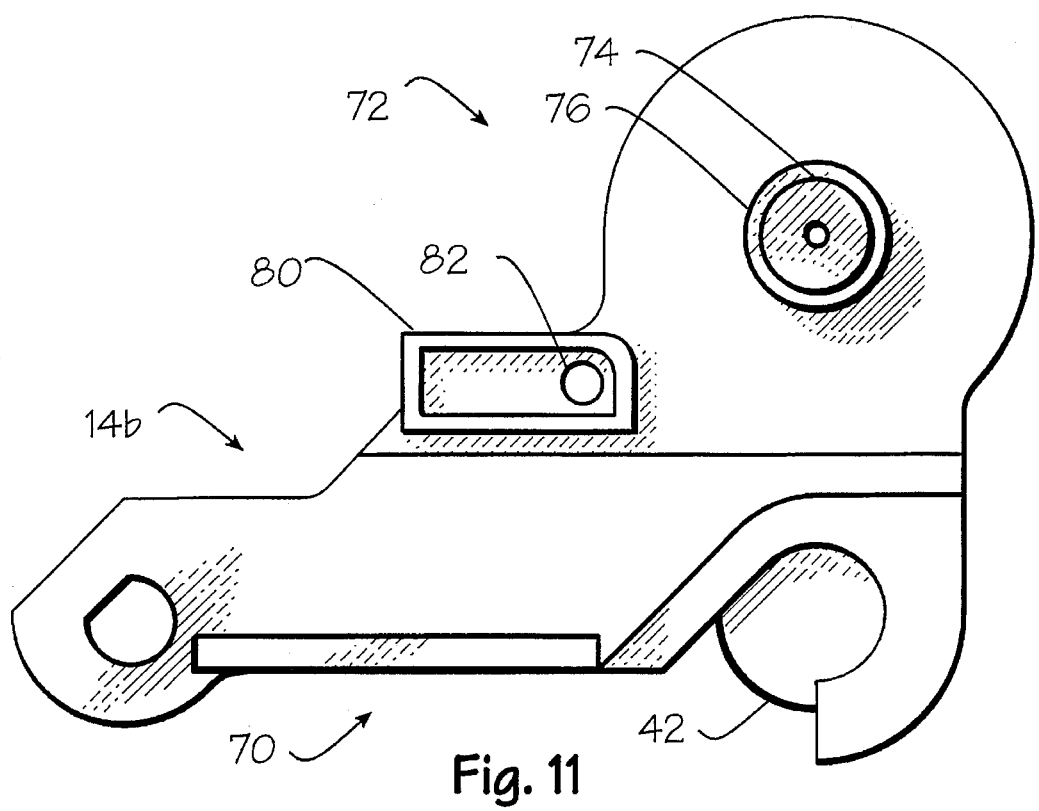
FIG. 11 is an inner side elevational view of the side of the spool link body shown in FIG. 10.

Body side 14a as shown in FIGS. 6–9 of course constitutes only one-half of body 14. An opposing and completing side 14b is depicted in FIGS. 10–15. Like side 14a, side 14b is a single, integral molded piece of low-friction plastic. FIG. 11 depicts an inside elevational view of side 14b. Like side 14a, side 14b is comprised of a chassis portion 70 and a spool portion 72. Spool portion 72 is essentially a mirror image of the overall configuration of spool portion 58 of side 14a, and matches the shape and diameter of center ring 18 and spool hubs 20 shown in FIG. 1. However, spool portion 72 of second side portion 14b includes an internal connecting pin 74 extending from the inside surface of side portion 14b to opposing side portion 14a. Pin 74 is best illustrated in the front elevational view of FIG. 10. Pin 74 includes an integrally formed spacing shoulder 76 having a substantially identical width as rectangular spacer 80 shown below it in the front elevational view of FIG. 10 and as more clearly depicted in the inside elevational view of FIG. 11.

Within spacer 80, side 14b has a hole 82 defined therethrough for receiving pin 66 from the opposing first side 14a when the two sides are assembled together. Therefore the rectangular spacer 64 from side 14a will be brought into position within rectangular spacer 80 of side 14b, with pin 66 extending through 14b and secured on its opposing end, extending exteriorly from side 14a, by means of C-ring (not shown). Spacer 64 will conformably nest into spacer 80 to provide interlocked engagement between sides 14a and b.

Figure 12:
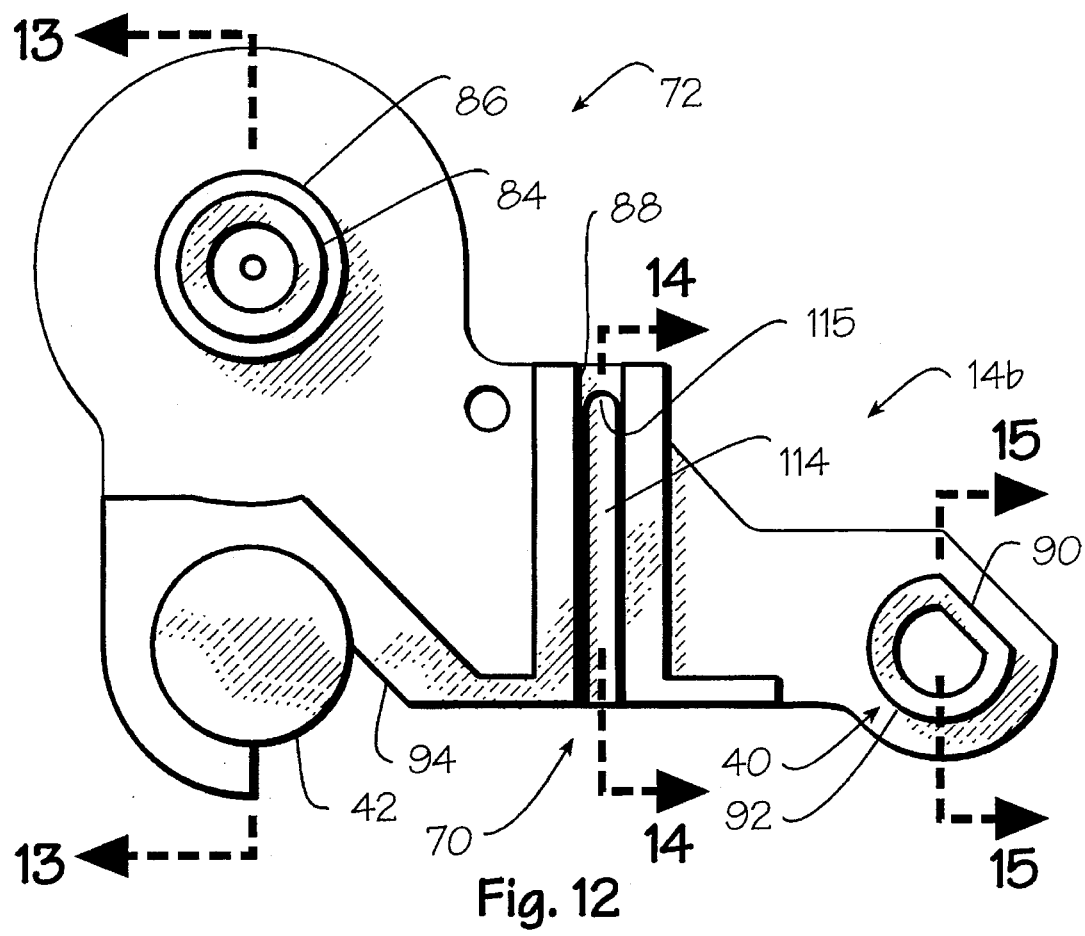
FIG. 12 is an outer side elevational view of the side of the spool link body shown in FIGS. 10 and 11.

A corresponding exterior pivot 84 corresponding to pivot 60 in side 14a is defined in side 14b, as best shown in exterior side elevational view of FIG. 12 and the front elevational view of FIG. 10. Exterior pivot 84 is integrally formed from spool portion 72 and includes a shoulder 86 corresponding to shoulder 62 in side 14a.

The outside elevational view of second side 14b is best depicted in FIG. 12, and includes a slot 88 defined within side 14b corresponding to slot 68, as shown in FIGS. 7 and 9, in side 14a.

The detailed structure of second side 14b, as depicted in FIGS. 10 and 12, can better be understood by considering the various cross-sectional views of FIG. 12 shown in FIGS. 13–15.

FIG. 13 is a cross sectional view taken through sectional lines 13—13 of FIG. 12, and illustrates how coaxial pin 74 and pivot pin 84 are integrally formed or molded from a single piece, with their corresponding shoulders 76 and 86, respectively. The interior cross section of bearing 42 is also there depicted, and is shown as providing a round cylindrical receiving surface for cammed shoulder 40.

FIG. 14 is a side cross-sectional view taken through section lines 14—14 of FIG. 12, and illustrates the detailed structure of slot 88 in which leg 26 rides in sliding contact. Formation of spacer 80 in relation to half of a slot 88 is clearly depicted in FIG. 14.

FIG. 15 is a side cross-sectional view taken through section lines 15—15 of FIG. 12, and illustrates the cross section of the cammed shoulder 40 and, in particular, cammed surface 90.

It can now be readily appreciated that cammed shoulder 40 has a partial diameter from cammed surface 90 to its diametrically opposing point 92, as shown in FIG. 12, that is small enough to easily slide into keyway opening 94 defined in the flange portion 70 of body 14 adjacent to capturing bearing 42 of the next successive spool link 10. The angle at which one spool link 10 must be oriented in order to fit cam shoulder 40 through keyway opening 94 in the capturing bearing 42 of the next spool link is an angle which is never achieved between the spool links 10 in normal operation, due to the typically large diameter of the drive wheel 50. Thus, once the spool links 10 have been assembled together by inserting cammed shoulder 40 into the next adjacent capturing bearing 42, they will never again assume an angular relationship which will permit their disengagement. Still, the relative rotation of shoulder 40 within the capturing bearing 42 of the next spool link 10 allows the succession of spool links to be flexibly driven around drive wheel 50 in the manner shown in FIG. 3 without any real possibility of disengagement. Also, fabrication of the spool link bodies 14 from low-friction plastic permits smooth rotation of the cammed shoulder 40 within the capturing bearing 42 of the next successive spool link 10, as the succession of spool links 10 travels about the drive wheel 50, for a long period of time without binding or excessive wear.

At this point, it can be appreciated that each spool link 10 basically constitutes five principal pieces, namely, the two integrally molded side portions 14a and 14b, two spool hubs 20 and a center ring 18. Sides 14a and 14b fit together by means of pin 66 of side 14a, as shown in FIG. 8, extending into aperture 82 of side 14b, shown in FIG. 11; and pin 74 of side 14 b extending into the cavity 96 defined within pivot pin 60 of side 14a, as shown by reference numeral 96 in FIG. 6. Pin 74 will extend entirely within and be slip fit or securely captured within cavity 96 of pin 60 until shoulder 76 is brought into juxtaposition or abutment against the opposing side 14b. It will also be seen that rectangular spacer 64 of side 14a, as shown in FIG. 6, slip fits into rectangular receptacle 80 of side 14b, shown in FIG. 11.

Sides 14a and 14b thus snugly nest together and are secured by means of pins 66 and 74, while spool hubs 20 and center ring 18 are similarly retained on pivots 84 and 60 by means of crimped or locking washers disposed on the outside of pivots 60 and 84.

Figure 18:
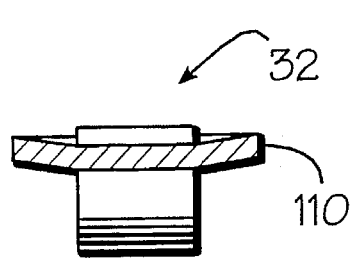
FIG. 18 is a cross sectional view through section lines 18—18 of FIG. 17.
Figure 19:
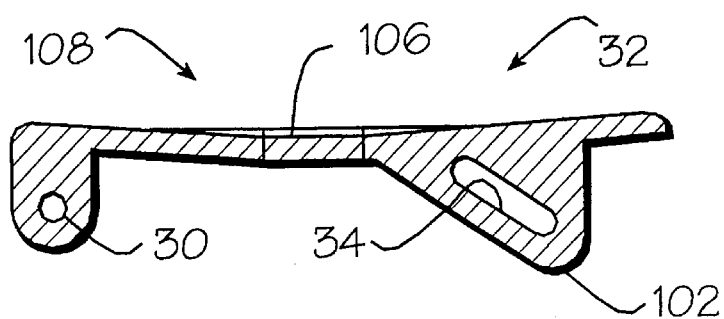
FIG. 19 is a cross sectional view through section lines 19—19 of FIG. 17.
Figure 20:
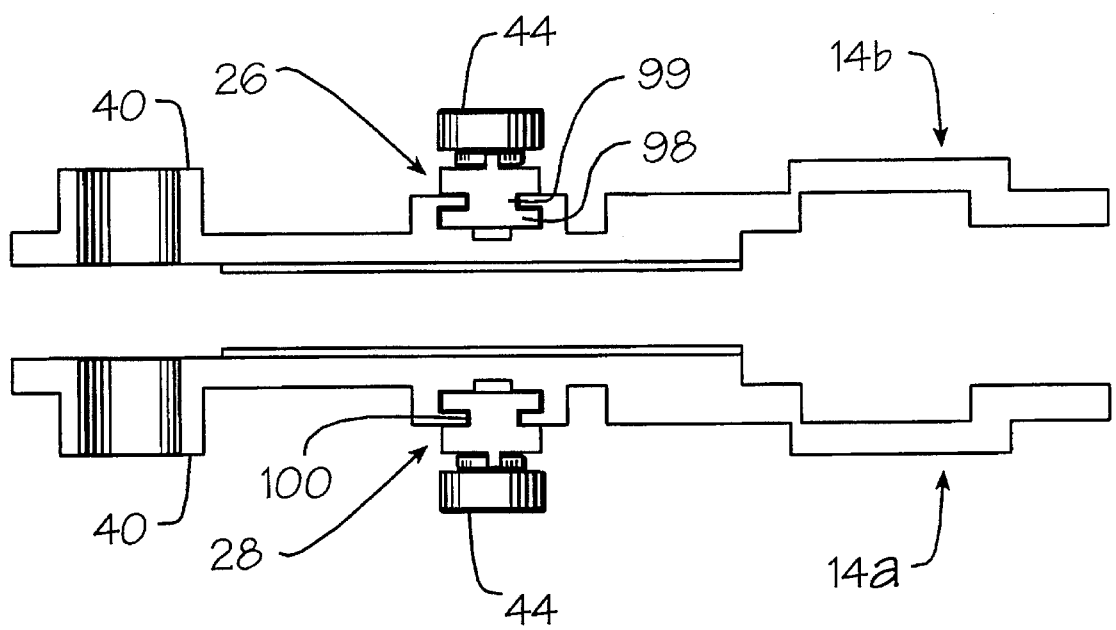
FIG. 20 is a cross sectional view through section lines 20—20 of FIGS. 1 and 16.

The structure and operation of one embodiment of cradle 16 can now be understood by turning to FIGS. 16–20. Cradle 16, as shown in front elevational view in FIG. 16 in isolation from the other elements of spool link 10, is, as previously stated, comprised of a left leg 26 and right leg 28 each coupled to saddle 32. Again, each lower end of legs 26 and 28 optionally has a roller wheel 44 pivotally coupled thereto. As particularly shown in FIG. 20, legs 26 and 28 are identically splined or formed to have an interior vertical flange 98, separated from the remaining portion of the leg by a vertical grove 100. The vertical flange is attached to the remaining portion of the leg by means of a smaller support flange 99, which, with vertical flange 98, is integrally molded with the remainder of the leg. This overall structure allows vertical flanges 98 to slide easily within slots 68 and 88 of sides 14a and 14b, respectively, as shown in FIG. 20.

Figure 16:
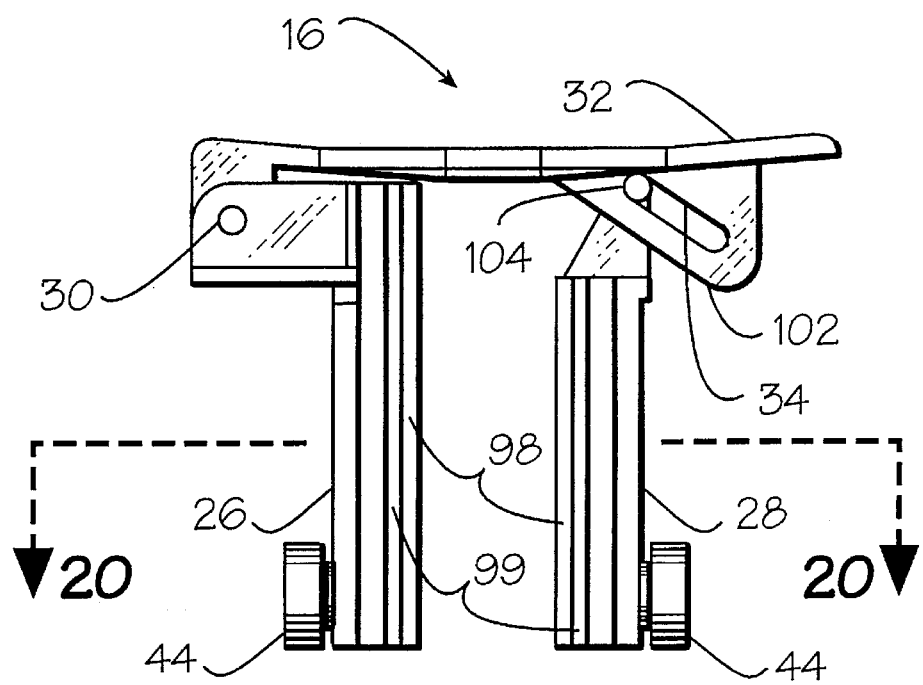
FIG. 16 is a front elevational view of the assembled intra-spool cradle, according to an embodiment of the invention.

In this embodiment, the upper end of left leg 26, as seen in the orientation of FIG. 16, is pivotally coupled by pivot 30 to one end of saddle 32. The opposing end of saddle 32 has a descending flange 102 in which a slot 34 is defined. An integrally extending pin 104, formed as part of the upper end of right leg 28, is disposed into slot 34, allowing legs 26 and 28 to be independently displaced in a vertical direction. If, for example, the left leg 26 is held stationary within slot 88 of side 14b, and right leg 28 is caused to slide upward through slot 68 in side 14a, this will cause pin 104 to slide within slot 34, causing saddle 32 to pivot upward about pivot 30, thereby providing the motive force to eject an object held by or above the saddle 32, toward the left.

Figure 17:
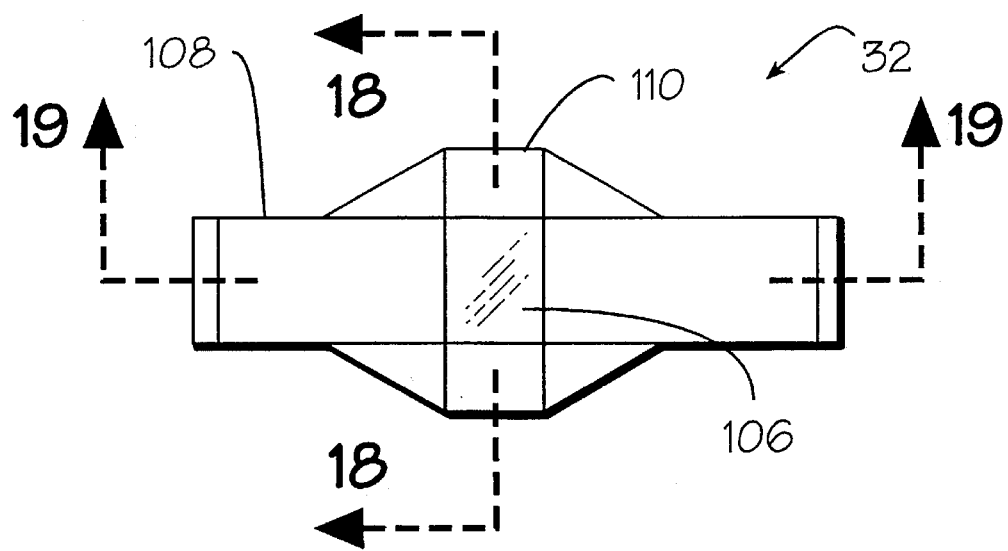
FIG. 17 is a plan view of the cradle shown in FIG. 16.

The plan view of saddle 32 is shown in FIG. 17 as being a single and integral piece forming the base of a nest otherwise formed by successive spools 12. It is within this nest that the citrus fruit or other object carried by the conveyor system will rest. Small objects may touch the saddle 32, as well as the spools 12; larger objects will be held only by the spools 12. But objects of a variety of sizes may be carried and ejected in the manner just described.

The contour of saddle 32 is best depicted through the cross sectional views taken through section line 18—18 of FIG. 17, as shown in FIG. 18, and section lines 19—19 of FIG. 17, as shown in FIG. 19. Saddle 32 is cupped in both directions so that its lowest point and therefore the preferred position of stability of an object having a circular periphery is within central region 106. As may be appreciated by viewing FIG. 1, saddle 32 has a principal lateral extent 108 which runs generally parallel to the axis of the spool 12. Extending midway within saddle 32, transverse to the spool axis, are a pair of oppositely disposed flanges 110 which generally fill in the space between successive spools 12, which is space is opened on account of the increasing spool diameter towards its medial plane. Thus, substantially all the interlying space between successive spools 12 is filled with the structure of saddle 32.

The operation of cradle 16 as depicted in assembled form in FIG. 16 can now be readily understood with reference back to FIGS. 2–5. If an actuatable ramp 46 is provided at any point along rail 35 and the ramp is unactuated (i.e., caused to point outward—a condition not shown in FIG. 4 or 5), the roller wheel at the base of right leg 28 will ride beneath the ramp, and there will be no resulting activation of the cradle 16. If, on the other hand, the ramp is activated by lowering it in the direction from which the conveyor is traveling (as shown in FIGS. 4 and 5), the roller wheel 44 will ride up the ramp, as shown in FIG. 5, causing the leg of the cradle 16 which carries that roller wheel 44 to be lifted, thus actuating one side of the cradle 16. As described above, this will result in ejection of any object carried in the nest of which that cradle 16 is a component.

On the other hand, if two such ramps 46 are provided, symmetrically disposed on opposite sides of the vertical flange 38, then both legs 26 and 28 will simultaneously be driven upward, thereby providing a parallel elevation action of the cradle 16 and saddle 32, lifting the fruit or other object upward between the successive spools 12. This action may be utilized when weighing the fruit resting within the nest formed by saddle 32 and successive spools 12, in which case an appropriate transducer would be provided in ramps 46, or a weighing platform would be provided, such as a level extension platform 110, as shown in FIG. 4.

Alternatively, simultaneous vertical actuation of legs 26 and 28 can be used to raise the fruit or other object to an inspection position, or to a printing station for applying a label or trademark, or to allow video inspection of the fruit for grading purposes, or for any other fruit or object handling operation.

It is also possible that legs 26 and 28 could both be activated, but at differential heights so that a combination of both vertical raising of saddle 32 together with its rotation could be simultaneously effected if desired. Cradle 16 is maintained within its coupling slots defined of sides 14a and 14b as a result of the abutment of the extending end of a pivot pin 112 extending through roller wheels 44 riding in a recessed grove 114 and ultimately against a blind end 115 of slot 68 as best depicted the side elevational view of FIG. 7 for first side 14a, and for second side 14b in FIG. 12.

Figure 21A:
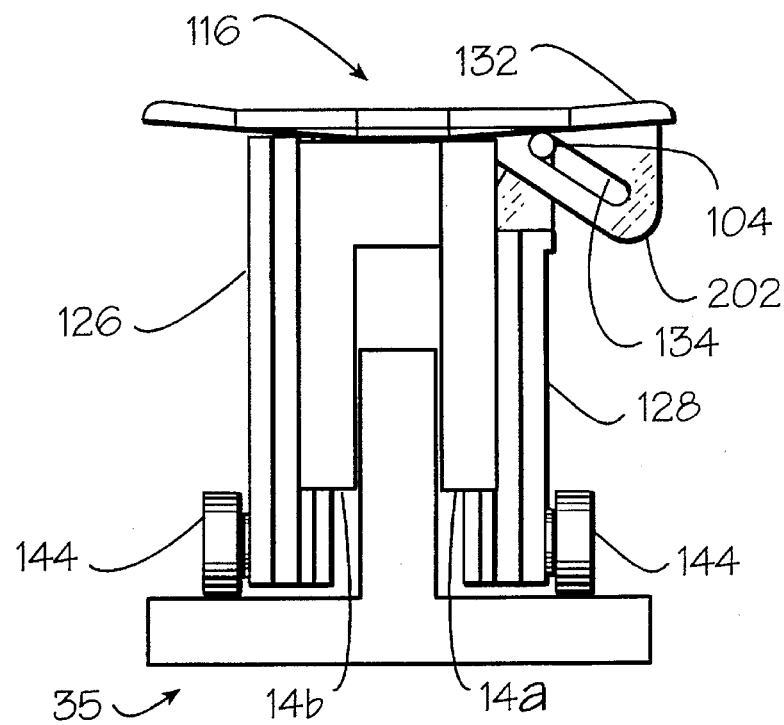
FIGS. 21a, b, c are front elevational views of the assembled intra-spool cradle, according to another embodiment of the invention, in successive states of activation.

FIGS. 21a, b, c illustrate a different embodiment of the cradle 16, and the manner in which it may be activated. To facilitate the following discussion, reference will be made to the orientation shown in FIGS. 21a, b, c, by which the cradle leg identified with reference numeral 126 will be referred to as the left cradle leg, and the right cradle leg will be identified with reference numeral 128. The right and left sides of these figures will be referred to consistently with these references.

It will readily be noted that in this embodiment, the pivot 130 about which saddle 132 rotates in respect to leg 126 is on the interior side of leg 126. This is in contrast to pivot 30 which is on the exterior side of leg 26, as shown in FIG. 16. That difference in the relative positioning of the components facilitates a greater tilting action on saddle 132 than would normally be achieved in the embodiment shown in FIG. 16. It also allows that tilting action to be combined with a lifting action, as a smooth combination of motions. This is illustrated by reference, in sequence, to FIGS. 21a, b and c.

FIG. 21a shows the cradle 116 in rest position—i.e., as it would be configured when neither wheel 144 rides up upon actuatable or non-actuatable ramp 46 (see FIGS. 4 and 5).

Figure 21B:
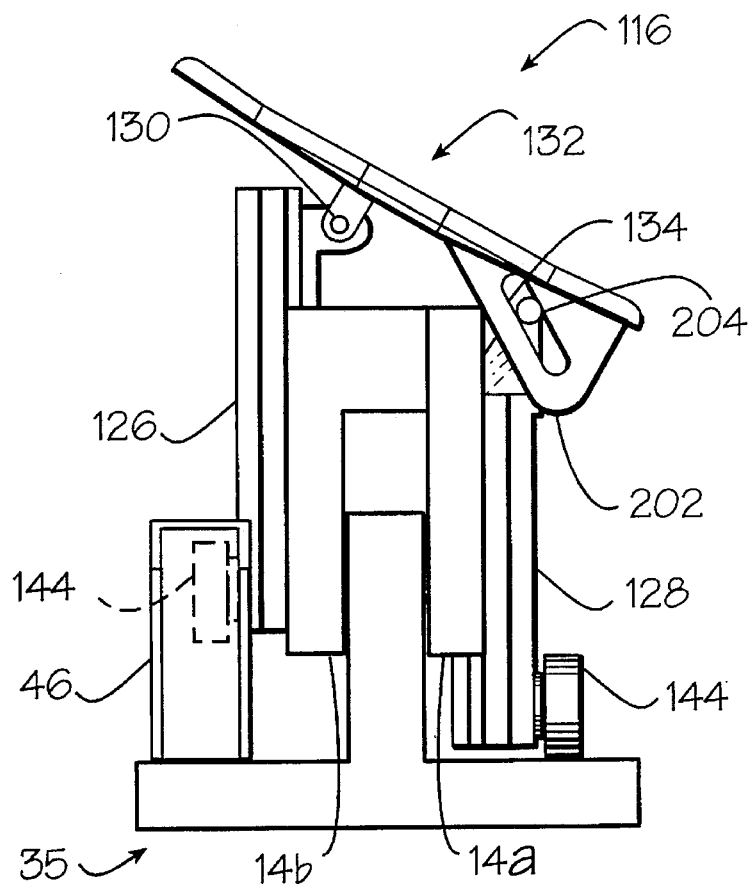

In FIG. 21b, leg 126 has begun to ride up ramp 46. This causes leg 126 to move vertically, which, in turn, causes saddle 132 to tilt to the right on account of its pivoting about pivot 130. The condition shown in this FIG. 21b is that of maximum tilt of the saddle 132 which can be achieved without raising leg 128. Leg 128 has not been raised because the side of saddle 132 opposite that which rotates about pivot 130 has rotated about pivot 204, but flange 202 has not been lifted sufficiently to force pivot 204 to slide downward within slot 134. Since the pivot has not moved, leg 128 which is integral with pivot 204 is not lifted.

However, in FIG. 21c, wheel 144 has reached the top of the ramp 46. This additional vertical motion of leg 126 has transferred through saddle 132 into flange 202, which, because it is integral with, has been caused to rise along with saddle 132. This rise of flange 202 has caused pivot 204 to slide within slot 134 to its maximum downward position. It will be appreciated that because of the exact configuration of the components, this additional rise of saddle 132 will normally cause a slight additional tilt of saddle 132 toward the right.

Thus, as leg 126 rides up ramp 46, there is first an increasing tilting motion of saddle 132 toward the right, followed by a lifting of saddle 132 upward accompanied by a relatively more slight additional rightward tilting of saddle 132.

No further lifting or tilting Of the saddle 132 is possible in this embodiment of cradle 116. This is because, in the configuration shown in FIG. 21c, upward movement of leg 126 within cradle 116 is limited, internally, by blind end 115 of slots 68 and 88 in body half 14a and 14b, respectively. This blind end 115 is best seen in FIGS. 7 and 12.

Certainly, if leg 126 could be raised higher, that additional lifting would transfer through saddle 132 to cause flange 202, through slot 134 therewithin, to pull pivot 204 upward. This would cause opposite leg 128 to move upward, since pivot 204 is integral therewith. However, for the purpose of ejecting citrus fruit from the spool link 10 of the present invention, it has been found to be more desirable to limit the upward motion of leg 126 in the manner described. It is possible that for other applications it might be more desirable to allow opposite leg 128 to begin to move upward, by repositioning the stop in respect to leg 126, but this is left for experimentation of those skilled in the art, within the teachings of the present Specification.

In general, it will be understood that by altering the positions and orientations of the pivots by which either or both of the legs 26, 28 or 126, 128 are secured to the saddle 32, and/or by adjusting the positioning and orientation of the ramp 46 (or ramps 46, if they are provided on opposite sides of the track) objects can be lifted, or they can be tilted to the right or left, or some combination of such actions can be achieved. These modifications are all well within the skill of the ordinary practitioner, based on the teachings herein given.

Indeed, many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The illustrated embodiment is described as being made of molded, high impact, low-friction plastic, but could be made out of any material, including metals or composites by any means of fabrication or manufacture. In addition the detailed structure of the component parts has been shown in one form, but could be modified in many different ways from that illustrated without departing from the functional teaching included within the invention. For example, spacers 80 and 64 have shown in one form, but the spacers and means by which sides 14a and b can be molded and made to nest together can be varied widely according to design choice. The shape and interconnection of legs 26 and 28 to both sides 14a and b and to saddle 32 (and the corresponding structures referred to in respect to FIGS. 21a, b, c) can also be substantially changed in form while still serving the same function. Likewise, a wedge-shaped projection at the lower portion of the legs 26, 28 or 126, 128, pointing toward the direction of travel, might be substituted for the roller 44, if a sliding action up the ramp 46 is desired.

The words used in this specification to describe the invention and its various embodiments are to be understood not only in the sense of their commonly defined meanings, but to include, by special definition in this specification, structure, material or acts beyond the scope of the commonly defined meanings. Thus if an element can be understood in the context of this specification as including more than one meaning, then its use in a claim must be understood as being generic to all possible meanings supported by the specification and by the word itself. The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements. The claims are thus to be understood also to include what is conceptually equivalent to the elements described, what can be obviously substituted and also what essentially incorporates the essential idea of the invention.

I claim:

1. A conveyor element for guided movement along a rail, comprising:

a body, said body comprising:

a rigid axis, a first body structure rigidly attached to said axis, and a second body structure rigidly attached to said axis, wherein the respective shapes of said first and second body structures are in mating relationship, said first and second body structures collectively forming a receiving channel through which said rail is disposable; and an object carrying spool supported by said axis and rotatable thereabout.

2. The conveyor element as recited in claim 1, wherein: said first and second body structures includes a first portion having a substantially circular periphery and a hollow interior region; and said first and second body structures include a second portion whose peripheral shape is complementary to the shape of the hollow interior region of said first portion.

3. The conveyor element as recited in claim 2, wherein the hollow region of said first portion is exposed to the ambient through an orifice, and the periphery of said second portion includes a diametric dimension which is narrower than the narrowest width of said orifice.

4. The conveyor element as recited in claim 1, wherein said first and second body structures comprise two separable opposing members respectively, which two members are joined together to form said body.

5. The conveyor element as recited in claim 4, wherein each of said two members includes a portion of said axis and incorporates parts which are complementary in shape with corresponding parts of the other of said two members, and said axis may be constructed by joining said two members by mating said respectively complementary parts thereof.

6. A conveyor element comprising:

a body, said body comprising:

a rigid axis, a first body structure rigidly attached to said axis, and a second body structure rigidly attached to said axis, wherein the respective shapes of said first and second body structures are in mating relationship:

a spool supported by said axis and rotatable thereabout; and selectively operable means to move an object from said body.

7. The conveyor element as recited in claim 6, wherein said object movement means comprises a cradle, said cradle slideably mounted to said body.

8. The conveyor element as recited in claim 7, wherein said object cradle comprises:

a first leg, slideably mounted to one side of said body;

a second leg, slideably mounted to the opposite side of said body; and a saddle mounted to said first and second legs at the upper portions thereof.

9. The conveyor element as recited in claim 8, wherein said saddle is pivotally mounted to said first leg.

10. The conveyor element as recited in claim 8, wherein said saddle is pivotally mounted to said second leg.

11. The conveyor element as recited in claim 9, wherein said saddle is pivotally mounted to said second leg.

12. The conveyor element as recited in claim 8, further comprising activation means to cause said first leg to slide relative to said body while said second leg does not so slide.

13. The conveyor element as recited in claim 8, further comprising activation means to cause said first and second legs to slide simultaneously relative to said body.

14. The conveyor element as recited in claim 13, wherein said activation means causes said first and second legs to slide simultaneously to substantially the same longitudinal degree.

15. The conveyor element as recited in claim 12, wherein said activation means comprises contact means associated with the lower portion of said first leg for activating sliding motion of said first leg in response to contact between said contact means and a surface external to said conveyor element.

16. The conveyor element as recited in claim 13, wherein said activation means comprises contact means associated with the lower portions of said first and second legs for activating simultaneous sliding motion of said first and second legs in response to contact between each of said contact means and respective surfaces external to said conveyor element.

17. A conveyor element comprising: a body, said body comprising:

a rigid axis, a first body structure rigidly attached to said axis, and a second body structure rigidly attached to said axis, wherein the respective shapes of said first and second body structures are in mating relationship; and a spool supported by said axis and rotatable thereabout, wherein said spool comprises a plurality of spool elements, each of said spool elements independently rotatable about said rigid axis.

18. An interconnected sequence of at least two conveyor elements, each of said conveyor elements comprising:

a body, said body comprising:

a rigid axis, a first body structure rigidly attached to said axis, and a second body structure rigidly attached to said axis, wherein the respective shapes of said first and second body structures are in mating relationship;

a spool supported by said rigid axis and rotatable thereabout; and means for securely coupling a first portion of said first and second body structures of one of said conveyor elements to a second portion of said first and second body structures of the adjacent said conveyor element.

19. The sequence of conveyor elements as recited in claim 18, wherein: said means for securely coupling comprises a substantially circular periphery and a hollow interior region formed in said first portions of said first and second body structures; and wherein each of said second portions of said first and second body structures has a peripheral shape which is complementary to the shape of the hollow interior region of said first portion.

20. The sequence of conveyor elements as recited in claim 19, wherein the hollow region of said first portion of each of said first and second body structures is exposed to the ambient through an orifice, and the periphery of said second portion of each of said first and second body structures includes a diametric dimension which is narrower than the narrowest width of said orifice of the adjacent said conveyor element.

21. The sequence of conveyor elements as recited in claim 18, wherein said body of each of said plurality of conveyor elements is configured such that the spacing between the spool of one said conveyor element and the spool of the adjacent said conveyor element is such that an object may be supported by said adjacent spools.

22. The sequence of conveyor elements as recited in claim 18, wherein at least one of said spools comprises a plurality of spool elements, each of said spool elements independently rotatable about said rigid axis incorporated in said one conveyor element which includes said spool.

23. The sequence of conveyor elements as recited in claim 21, wherein said body of each of said plurality of conveyor elements further comprises selectively operable means to cause an object to be moved from said conveyor element.

24. The sequence of conveyor elements as recited in claim 23, wherein each of said object movement means comprises
a first leg, slideably mounted to one side of said body;
a second leg, slideably mounted to the opposite side of said body; and
a saddle mounted to said first and second legs at the upper portions thereof.

25. The sequence of conveyor elements as recited in claim 24, wherein said saddle is positioned between the spool of one said conveyor element and the spool of said conveyor element adjacent thereto.

26. The sequence of conveyor elements as recited in claim 25, wherein the spacing between the spool of one said conveyor element and the spool of the adjacent said conveyor element is such that an object may be supported within the nest created by said adjacent spools and said saddle.

27. The sequence of conveyor elements as recited in claim 24, wherein said saddle is pivotally mounted to said first leg.

28. The sequence of conveyor elements as recited in claim 24, wherein said saddle is pivotally mounted to said second leg.

29. The sequence of conveyor elements as recited in claim 27, wherein said saddle is pivotally mounted to said second leg.

30. The sequence of conveyor elements as recited in claim 24, further comprising activation means to cause said first-leg to slide relative to said body while said second leg does not so slide.

31. The sequence of conveyor elements as recited in claim 24, further comprising activation means to cause said first and second legs to slide simultaneously relative to said body.

32. The sequence of conveyor elements as recited in claim 31, wherein said activation means causes said first and second legs to slide simultaneously to substantially the same longitudinal degree.

33. The sequence of conveyor elements as recited in claim 30, wherein said activation means comprises contact means associated with the lower portion of said first leg for activating sliding motion of said first leg in response to contact between said contact means and a surface external to said conveyor element.

34. The sequence of conveyor elements as recited in claim 33, wherein said activation means comprises contact means associated with the lower portion of said first leg for activating sliding motion of said first leg in response to contact between said contact means and a surface external to said conveyor element.

35. An object conveyor, comprising: a plurality of conveyor elements interconnected to form an endless sequence of conveyor elements, each of said conveyor elements comprising:
a body, said body comprising:
a rigid axis,
a first body structure rigidly attached to said axis,
a second body structure rigidly attached to said axis, wherein the respective shapes of said first and second body structures are in mating relationship, and
means for securely coupling said first and second body structures of each of said conveyor elements to said first and second body structures of the adjacent said conveyor element, and
a spool supported by said axis and rotatable thereabout;
a track configured to allow said sequence of conveyor elements to ride thereupon; and
motive means to cause said sequence of conveyor elements to move along said track.

36. The conveyor as recited in claim 35, wherein said body of each of said plurality of conveyor elements is configured such that the spacing between the spool supported by one said conveyor element and the spool supported by the adjacent said conveyor element is such that an object may be supported by said adjacent spools.

37. The conveyor as recited in claim 35, wherein each said spool comprises a plurality of spool elements, each of said spool elements independently rotatable about said rigid axis.

38. The conveyor as recited in claim 37, wherein said plurality of spool elements comprises a central ring positioned between two spool hubs.

39. The conveyor as recited in claim 38, wherein said central ring is in contact with said track, as said conveyor moves along said track.

40. The conveyor as recited in claim 39, wherein neither of said spool hubs is in contact with said track, as said conveyor moves along said track.

41. The conveyor as recited in claim 35, wherein the support for said conveyor upon said track is provided primarily by said spools riding upon said track.

42. The conveyor as recited in claim 41, wherein the support for said conveyor upon said track is provided primarily by said central rings riding upon said track.

43. The conveyor as recited in claim 35, wherein said body of each of said plurality of conveyor elements further comprises selectively operable means to cause an object to be moved from said conveyor element.

44. The conveyor as recited in claim 43, wherein each of said object movement means comprises
a first leg, slideably mounted to one side of said body;
a second leg, slideably mounted to the opposite of said body; and
a saddle mounted to said first and second legs at the upper portions thereof.

45. The conveyor as recited in claim 44, wherein said saddle is positioned between the spool of one said conveyor element and the spool of the adjacent said conveyor element.

46. The conveyor as recited in claim 45, wherein the spacing between the spool supported by one said Conveyor element and the spool supported by the adjacent said conveyor element is such that an object may be supported within the nest created by said adjacent spools and said saddle.

47. The conveyor as recited in claim 44, wherein said saddle is pivotally mounted to said first leg.

48. The conveyor as recited in claim 44, wherein said saddle is pivotally mounted to said second leg.

49. The conveyor as recited in claim 47, wherein said saddle is pivotally mounted to said second leg.

50. The conveyor as recited in claim 47, further comprising activation means to cause said first leg to slide relative to said body while said second leg does not so slide.

51. The conveyor as recited in claim 47, further comprising activation means to cause said first and second legs to slide simultaneously relative to said body.

52. The conveyor element as recited in claim 51, wherein said activation means causes said first and second legs to slide simultaneously to substantially the same longitudinal degree.

53. The conveyor as recited in claim 50, wherein said activation means comprises contact means associated with the lower portion of said first leg for activating sliding motion of said first leg in response to contact between said contact means and a surface external to said conveyor element.

54. The conveyor as recited in claim 53, wherein said surface is supported by said track.

55. The conveyor as recited in claim 54, wherein said sliding motion is caused by a selective change in the angular orientation of said surface.

56. The conveyor as recited in claim 55, wherein said first leg further comprises a wheel rotatable about a rigid axis, said axis supported by said first leg, and said wheel may be caused to roll upon said surface when the angular orientation of said surface is selectively changed.

57. The conveyor as recited in claim 56, wherein said wheel is caused to roll upwardly when said surface angle is caused to lower in the direction from which said conveyor moves, said upward rolling of said wheel causing upward sliding of said first leg.

58. The conveyor as recited in claim 53, wherein said activation means further comprises second contact means associated with the lower portion of said second leg for activating sliding motion of said second leg in response to contact between said second contact means and a surface external to said conveyor element.

59. The conveyor as recited in claim 58, wherein:

said surface is supported by said track;

said second leg further comprises a wheel rotatable about a rigid axis, said axis supported by said second leg; and said wheel is caused to roll upwardly when the angle of said surface in respect to said track is caused to lower in the direction from which said conveyor moves, said upward rolling of said wheel causing upward sliding of said second leg.

60. The conveyor as recited in claim 35, wherein: said means for securely coupling comprises a first portion of said first and second body structures having a substantially circular periphery and a hollow interior region; and a second portion of said first and second body structures whose peripheral shape is complementary to the shape of the hollow interior region of said first portion.

61. The conveyor as recited in claim 60, wherein the hollow region of said first portion of each of said first portions of said first and second body structures is exposed to the ambient through an orifice, and the periphery of each of said second portions of each of said first and second body structures includes a diametric dimension which is narrower than the narrowest width of said orifice of the adjacent said conveyor element.

62. The conveyor as recited in claim 61, wherein said second portion of said first and second body-structures is rotatable within said hollow interior region of said first portion of said first and second body structures.

63. The conveyor as recited in claim 62, wherein the maximum angle of rotation of said second portion within said hollow region is restricted by the shapes of said hollow interior region, said orifice and said second portion.

64. The conveyor as recited in claim 61, wherein said second portion of said first and second body structures may only be inserted into said hollow interior region of said first portion of said first and second body structures while said second body structure and said first body structure are held at a selected mutual orientation.

65. The conveyor as recited in claim 60, wherein a part of the periphery of said second portion of said first and second body structures comprises a circular arc and the remainder of the periphery of said second portion comprises a straight line.

66. The conveyor as recited in claim 35, wherein said motive means comprises:

a drive wheel operably contacting a plurality of said conveyor elements; and motor means operably connected to said drive wheel to cause forceful rotation of said drive wheel.

67. The conveyor as recited in claim 66, wherein said contact comprises direct contact between said drive wheel and said plurality of conveyor elements.

68. The conveyor as recited in claim 67, wherein said contact between said drive wheel and said plurality of conveyor elements is at said first portion of said first body structure thereof.

69. The conveyor as recited in claim 60, wherein said motive means comprises:

a drive wheel operably contacting said substantially circular periphery of said first portion of said first body structure of each of said conveyor elements; and motor means operably connected to said drive wheel to cause forceful rotation of said drive wheel.

70. The conveyor as recited in claim 69, wherein said drive wheel includes peripheral indentations, which indentations are geometrically complementary with said circular peripheries.

71. The conveyor as recited in claim 64, wherein said motive means comprises:

a drive wheel operably contacting said substantially circular periphery of said first portion of said first body structure of said conveyor elements, said drive wheel including peripheral indentations, which indentations are geometrically complementary with said circular peripheries; and motor means operably connected to said drive wheel to cause forceful rotation of said drive wheel, wherein the diameter of said drive wheel and the spacing of said peripheral indentations thereon are selected, in respect to the dimensions of said conveyor elements, so that said mutual orientation does not occur during operation of said conveyor.

72. A device for selectively moving objects away from a conveyor element and for selectively vertically displacing said objects while on said conveyor element, said conveyor element comprising a body and a spool rotatably secured to said body, said device comprising:

a first leg, slideably mounted to one side of said body to permit selective vertical movement of said first leg;

a second leg, slideably mounted to the opposite side of said body to permit selective vertical movement of said second leg independently from vertical movement of said first leg;

a saddle mounted to said first and second legs at the upper portions thereof; so that said saddle is movable either to selectively vertically displace said objects while on said conveyor element or to selectively move said objects away from said conveyor element by corresponding selective and independent vertical movement said first and second legs in said conveyor element either in unison or not.

73. The device as recited in claim 72, wherein said saddle is pivotally mounted to said first leg.

74. The device as recited in claim 72, wherein said saddle is pivotally mounted to said second leg.

75. The device as recited in claim 72, further comprising activation means to selectively cause said saddle to rise in respect to said conveyor element.

76. The device as recited in claim 72, further comprising activation means to selectively cause said saddle to tilt in respect to said conveyor element.

77. The device as recited in claim 75, further comprising weighing means, operably associated with said saddle, to cause an object supported by said saddle to be weighed when said saddle is caused to rise.

78. The device as recited in claim 76, wherein said activation means causes said saddle to tilt sufficiently to eject, from said saddle, an object supported thereby.

79. A device for selectively moving objects away from a conveyor element, said conveyor element comprising a body and a spool rotatably secured to said body, said device comprising:
- a first leg, slideably mounted to one side of said body;
- a second leg, slideably mounted to the opposite side of said body; and
- a saddle mounted to said first and second legs at the upper portions thereof,
- wherein said saddle is pivotally mounted to said second leg, and
- wherein said saddle is pivotally mounted to said second leg.

80. A device for selectively moving objects away from a conveyor element, said conveyor element comprising a body and a spool rotatably secured to said body, said device comprising:
- a first leg, slideably mounted to one side of said body;
- a second leg, slideably mounted to the opposite side of said body;
- a saddle mounted to said first and second legs at the upper portions thereof; and
- selective activation means to cause said first leg to slide relative to said body, independently of any substantial movement of said second leg.

81. The device as recited in claim 80, wherein said activation means selectively causes said first leg to slide relative to said body while said second leg does not so slide.

82. The device as recited in claim 80, wherein said activation means comprises contact means associated with the lower portion of said first leg for activating sliding motion of said first leg in response to contact between said contact means and a surface external to said conveyor element.

83. The device as recited in claim 82, wherein said sliding motion is caused by a selective change in the angular orientation of said surface.

84. The device as recited in claim 83, wherein said first leg further comprises a wheel rotatable about a rigid axis, said axis supported by said first leg, and said wheel may be caused to roll upon said surface when the angular orientation of said surface is selectively changed.

85. The device as recited in claim 84, wherein said wheel is caused to roll upwardly when said surface angle is caused to lower in a selected direction, said upward rolling of said wheel causing upward sliding of said first leg.

86. The device as recited in claim 80, further comprising second activation means associated with the lower portion of said second leg for causing sliding motion of said second leg in response to contact between said second contact means and a surface external to said conveyor element.

87. The device as recited in claim 86, wherein:
- said second leg further comprises a wheel rotatable about a rigid axis, said axis supported by said second leg; and
- said wheel is caused to roll upwardly when the orientation angle of said surface is selectively caused to lower in a selective direction, said upward rolling of said wheel causing upward sliding of said second leg.

88. A device for selectively moving objects away from a conveyor element, said conveyor element comprising a body and a spool rotatably secured to said body, said device comprising:
- a first leg, slideably mounted to one side of said body;
- a second leg, slideably mounted to the opposite side of said body;
- a saddle mounted to said first and second legs at the upper portions thereof; and
- activation means to cause said first and second legs to slide simultaneously relative to said body.

89. The device as recited in claim 80, wherein said activation means causes said first and second legs to slide simultaneously to substantially the same longitudinal degree.

90. A device for selectively moving objects away from a conveyor element, said conveyor element comprising a body and a spool rotatably secured to said body, said device comprising:
- a first leg, slideably mounted to one side of said body;
- a second leg, slideably mounted to the opposite side of said body;
- a saddle mounted to said first and second legs at the upper portions thereof; and
- activation means to selectively cause said saddle to tilt and rise in respect to said conveyor element.

* * * * *

UNITED STATES PATENT AND TRADEMARK OFFICE
CERTIFICATE OF CORRECTION

PATENT NO. : 5,611,419
DATED : March 18, 1997
INVENTOR(S) : Everette LaVars

It is certified that error appears in the above-indentified patent and that said Letters Patent is hereby corrected as shown below:

Cover Page, item [73] should read

Assignee: Sunkist Growers, Inc.
                   Ontario, California

Signed and Sealed this

Eleventh Day of November, 1997

Attest:

BRUCE LEHMAN

*Attesting Officer*     *Commissioner of Patents and Trademarks*